United States Patent
Kobayashi

(10) Patent No.: US 9,661,040 B2
(45) Date of Patent: May 23, 2017

(54) COLLABORATION PROCESSING APPARATUS, COLLABORATION PROCESSING SYSTEM, AND PROGRAM

(71) Applicant: Kazunori Kobayashi, Tokyo (JP)

(72) Inventor: Kazunori Kobayashi, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 382 days.

(21) Appl. No.: 13/833,235

(22) Filed: Mar. 15, 2013

(65) Prior Publication Data

US 2013/0254297 A1 Sep. 26, 2013

(30) Foreign Application Priority Data

Mar. 22, 2012 (JP) ................................. 2012-065107
Nov. 27, 2012 (JP) ................................. 2012-258189

(51) Int. Cl.
*G06F 15/16* (2006.01)
*H04L 29/06* (2006.01)
*G06F 9/50* (2006.01)

(52) U.S. Cl.
CPC .......... *H04L 65/403* (2013.01); *G06F 9/5044* (2013.01)

(58) Field of Classification Search
CPC .................................................... H04L 29/06
See application file for complete search history.

(56) References Cited

U.S. PATENT DOCUMENTS 7,092,985 B2   8/2006 Hubbard
7,209,249 B2   4/2007 Morita
(Continued)

FOREIGN PATENT DOCUMENTS

CN   101202806   6/2008
CN   102006381   4/2011
(Continued)

OTHER PUBLICATIONS

Chinese Office Action dated Jan. 26, 2015.
(Continued)

*Primary Examiner* — Nicholas Taylor
*Assistant Examiner* — Tania Pena-Santana
(74) *Attorney, Agent, or Firm* — IPUSA, PLLC

(57) ABSTRACT

A collaboration processing apparatus that is connected to plural electronic apparatuses, receives a request from an application installed in the collaboration processing apparatus, and controls the electronic devices based on the received request to perform a collaboration process by causing the application and the electronic devices to collaborate, includes a capability information providing unit which receives an acquisition request for information related to capability of the electronic device via a previously defined interface and provides the information related to the capability of the electronic devices in response to the received acquisition request; and an execution controlling unit which receives the execution request based on the information of the capability from the application, to which the information related to the capability is provided by the capability information providing unit, via the previously defined interface, and controls the electronic devices based on the received execution request.

17 Claims, 22 Drawing Sheets

(56) References Cited

U.S. PATENT DOCUMENTS

| | | | | |
|---|---|---|---|---|
| 2004/0243697 | A1* | 12/2004 | Otsuka | H04L 29/06 709/223 |
| 2006/0081714 | A1* | 4/2006 | King | G06F 17/277 235/472.03 |
| 2006/0090132 | A1* | 4/2006 | Jung | G06F 9/4446 715/705 |
| 2007/0067807 | A1* | 3/2007 | O'Neil | 725/62 |
| 2008/0259382 | A1* | 10/2008 | Mihara | G06K 15/00 358/1.15 |
| 2009/0293118 | A1* | 11/2009 | Yan | G06F 21/12 726/19 |
| 2010/0020185 | A1* | 1/2010 | Sako | H04N 5/247 348/211.1 |
| 2010/0073705 | A1 | 3/2010 | Cain | |
| 2011/0055323 | A1 | 3/2011 | Kawai et al. | |
| 2011/0176169 | A1 | 7/2011 | Kashioka | |
| 2011/0205586 | A1 | 8/2011 | Takahashi et al. | |
| 2012/0030329 | A1 | 2/2012 | Aoki et al. | |
| 2012/0209906 | A1* | 8/2012 | Ausfeld | H04L 51/36 709/204 |
| 2012/0240042 | A1* | 9/2012 | Migos | G06F 3/017 715/702 |

FOREIGN PATENT DOCUMENTS

| | | |
|---|---|---|
| CN | 102143216 | 8/2011 |
| EP | 1841180 | 10/2007 |
| JP | 2002-084383 | 3/2002 |
| JP | 2004-288055 | 10/2004 |
| JP | 2006-293742 | 10/2006 |
| JP | 2008-193355 | 8/2008 |
| JP | 2011-142673 | 7/2011 |
| JP | 2011-192250 | 9/2011 |
| JP | 2011-197827 | 10/2011 |
| JP | 2011-198343 | 10/2011 |
| JP | 2012-033067 | 2/2012 |
| WO | 2011/116060 | 9/2011 |

OTHER PUBLICATIONS

Chinese Office Action dated Jun. 23, 2015.
Extended European Search Report dated Mar. 2, 2016.
Chinese Office Action dated Nov. 27, 2015.
Japanese Office Action dated Jul. 19, 2016.

* cited by examiner

FIG.13

●ACQUIRING CAPABILITY OF DESIRABLE ELECTRONIC APPARATUS int GetCapability(
    ID deviceID,
    tCapability* capability
)

//ARGUMENT
deviceID   IDENTIFIER OF ELECTRONIC APPARATUS TO BE ACQUIRED
capability   CAPABILITY INFORMATION

//RETURN VALUE
0  SUCCESS
NEGATIVE  FAILURE

FIG.14A

●SCAN OCR
int doScanWithOcr(
    ID deviceID,
    Adr address,
    BYTE OcrOption
)

//ARGUMENT
deviceID IDENTIFIER OF ELECTRONIC APPARATUS TO SCAN
Address TRANSMISSION DESTINATION OF SCANNED IMAGE DATA
OcrOption PLACE WHERE OCR IS PERFORMED(ELECTRONIC APPARATUS OR PLATFORM)

//RETURN VALUE
0 SUCCESS
NEGATIVE FAILURE

FIG.14B

●PRINT
int doPrint(
    ID deviceID,
    FORMAT ConvertFormat,
    FILE FileName
)

//ARGUMENT
deviceID   IDENTIFIER OF ELECTRONIC APPARATUS TO PRINT
ConvertFormat   FORMAT OF IMAGE CONVERSION(NO CONVERSION IF 0)
FileName   FILE NAME OF FILE TO BE PRINTED

//RETURN VALUE
0   SUCCESS
NEGATIVE   FAILURE

FIG.14C

●PROJECTION TO PROJECTOR
int doProjection(
    ID deviceID,
    FORMAT ConvertFormat,
    FILE FileName
)

//ARGUMENT
deviceID    IDENTIFIER OF ELECTRONIC APPARATUS TO PROJECT
ConvertFormat  FORMAT OF IMAGE CONVERSION(NO CONVERSION IF 0)
FileName    FILE NAME OF FILE TO BE PROJECTED

//RETURN VALUE
0         SUCCESS
NEGATIVE  FAILURE

FIG.15

●USE OF FILE CONVERSION SERVICE int doFileConvert(
    FORMAT ConvertFormat,
    FILE InFileName,
    FILE* ConvertFileName
)

//ARGUMENT
ConvertFormat   DESTINATION OF FILE FORMAT TO BE CONVERTED
InFileName FILE NAME OF CONVERSION SOURCE
ConvertFileName FILE NAME OF CONVERTED FILE

//RETURN VALUE
0   SUCCESS
NEGATIVE   FAILURE

FIG.16

| DEVICE/ITEM | INPUT | PROCESS | OUTPUT |
|---|---|---|---|
| MFP | ■ SPEED<br>■ B&W, COLOR<br>■ SINGLE SIDE, DOUBLE SIDE, DOUBLE SIDE SIMULTANEOUSLY<br>■ PIXEL DENSITY | ■ OCR<br>■ ILLEGAL COPY GUARD<br>■ GRADATION PROCESS<br>■ RESOLUTION CONVERSION<br>■ INFORMATION ADDITION (PAGE, MARKING) | ■ SPEED<br>■ B&W, COLOR<br>■ SINGLE SIDE, DOUBLE SIDE<br>■ PIXEL DENSITY |
| PROJECTOR | ■ INPUT SIGNAL SYSTEM<br>■ IMAGE FORMAT | ■ MODE<br>■ HIGH PICTURE QUALITY FUNCTION<br>■ VARIOUS ADJUSTING FUNCTION | ■ PROJECTION SYSTEM<br>■ SCREEN SIZE<br>■ DISPLAY PIXEL NUMBER<br>■ BRIGHTNESS |
| TV MEETING SYSTEM | ■ IMAGE ENCORDING SYSTEM<br>■ SOUND ENCORDING SYSTEM | ■ IMAGE COMPOSITION FUNCTION<br>■ SCREEN ADJUSTING FUNCTION<br>■ ENCODING CONVERSION FUNCTION | ■ IMAGE ENCORDING SYSTEM<br>■ SOUND ENCORDING SYSTEM |
| . . . . | . . . . | . . . . | . . . . |

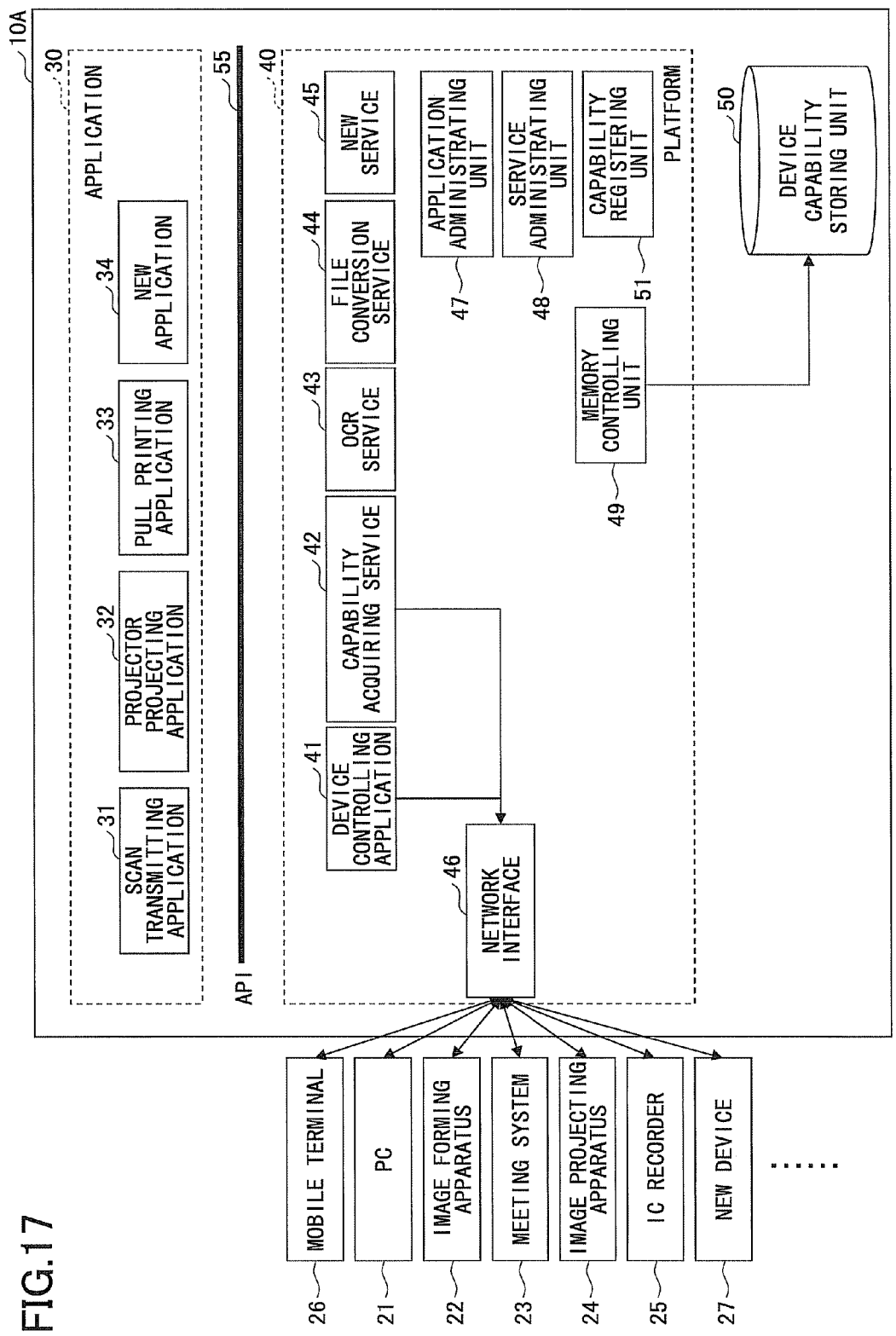

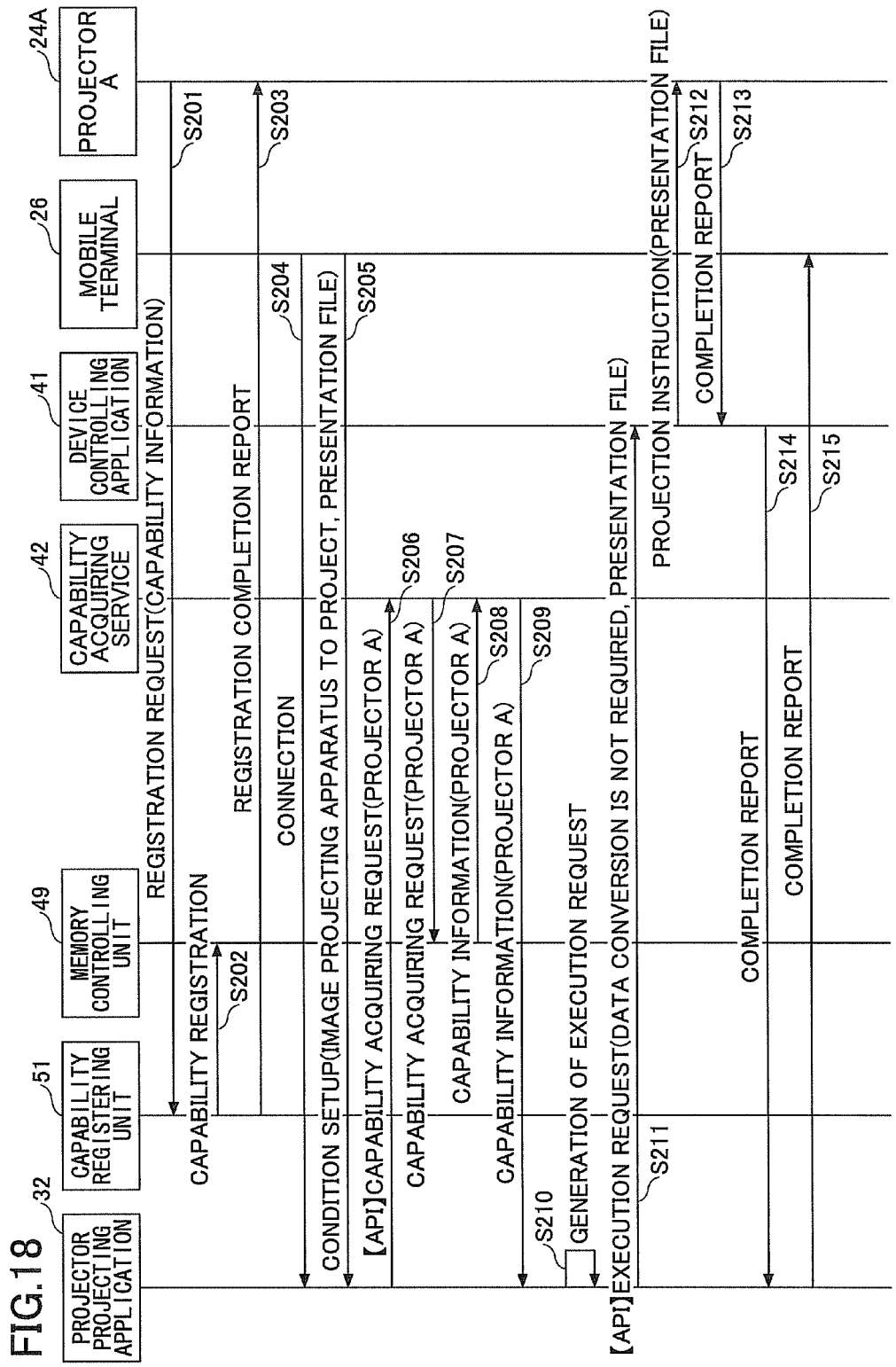

FIG.19

● CURRENTLY REGISTERED APPARATUS

[NEW REGISTRATION] — 202

| | APPARATUS ID | APPARATUS TYPE | IP ADDRESS | |
|---|---|---|---|---|
| 1 | A012 | MFP | 133.139.1.15 | |
| 2 | A033 | PROJECTOR | 133.139.1.29 | REFERENCE·EDITION |
| 3 | B001 | TABLET | 14.157.12.3 | REFERENCE·EDITION |
| 4 | X002 | TV MEETING SYSTEM | 133.139.3.11 | REFERENCE·EDITION |
| 5 | A035 | PROJECTOR | 133.139.2.12 | REFERENCE·EDITION |
| 6 | X008 | TV MEETING SYSTEM | 14.157.12.8 | REFERENCE·EDITION |
| 7 | D002 | PROJECTOR | 133.139.1.44 | REFERENCE·EDITION |
| 8 | C015 | MFP | 22.14.11.124 | REFERENCE·EDITION |

201 — REFERENCE·EDITION
200 — window

FIG. 20

| CAPABILITY INFORMATION | | |
|---|---|---|
| APPARATUS ID : A012 | | |
| ■BASIC INFORMATION | | |
| ITEM | CONTENTS | |
| APPARATUS TYPE | MFP | |
| IP ADDRESS | 133.139.1.15 | |
| ■CAPABILITY INFORMATION | | |
| ①INPUT | | |
| ITEM (※NECESSARY) | CONTENTS | |
| SPEED (/MIN.)※ | 45 | |
| B&W・COLOR※ | ○ B&W  ● COLOR | |
| READING TYPE※ | ○ SINGLE SIDE  ○ DOUBLE SIDE  ● DOUBLE SIDE SIMULTANEOUSLY | |
| PIXEL DENSITY | | |
| ②PROCESS | | |
| ・OCR  ● YES  ○ NO | ・ILLEGAL COPY GUARD  ○ YES  ● NO | |
| ・PDF CONVERSION  ● YES  ○ NO | ・INFORMATION ADDITION (MARKING)  ☑ | |
| ③OUTPUT | | |
| ITEM (※NECESSARY) | CONTENTS | |
| SPEED (/MIN.)※ | 35 | |
| B&W・COLOR※ | ○ B&W  ● COLOR | |
| PRINTING TYPE※ | ○ SINGLE SIDE  ● DOUBLE SIDE | |
| PIXEL DENSITY | | |

DELETE APPARATUS

COMPLETION

COLLABORATION PROCESSING APPARATUS, COLLABORATION PROCESSING SYSTEM, AND PROGRAM

BACKGROUND OF THE INVENTION

1. Field of the Invention

The present invention generally relates to a collaboration processing apparatus, a collaboration processing system, a collaboration processing method, and a program.

2. Description of the Related Art

In recent years, a mode of using software provided on a network such as the Internet without executing an application program in an information processing apparatus such as a host computer is becoming popular. A so-called cloud computing is known as a technique of using software on the network.

Conventionally, there is a print system using cloud computing (for example, Patent Document 1).

In a mode (a system) of using a Web application represented by a cloud computing service or a mode (a system) using an application on a server side, a further improvement of a utility value is expected by a collaboration between an electronic device connected to a system and a Web application or a server side application.

However, in a system represented by the cloud computing system, there is no structure enabling the electronic device to be connected to the system and the Web application or the server application to collaborate.

Patent Document 1: Japanese Laid-Open Patent Application No. 2011-192250

SUMMARY OF THE INVENTION

Accordingly, embodiments of the present invention provide a novel and useful collaboration processing apparatus, a collaboration processing system, a collaboration processing method, and a program solving one or more of the problems discussed above.

One aspect of the embodiments of the present invention may be to provide a collaboration processing apparatus that is connected to a plurality of electronic apparatuses, receives a request from an application installed in the collaboration processing apparatus, and controls the electronic devices based on the received request to perform a collaboration process by causing the application and the electronic devices to collaborate, including a capability information providing unit which receives an acquisition request for information related to the capability of the electronic device via a previously defined interface and provides the information related to the capability of the electronic devices in response to the received acquisition request; and an execution controlling unit which receives the execution request based on the information of the capability from the application, to which the information related to the capability is provided by the capability information providing unit, via the previously defined interface, and controls the electronic devices based on the received execution request.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 13 is an exemplary explanatory diagram of a capability acquisition API.

FIGS. 14A-14C are exemplary explanatory diagrams of an execution control API.

FIG. 15 is an exemplary explanatory diagram of a processing service execution API.

FIG. 16 is an explanatory diagram illustrating an exemplary template of a capability stored in a device capability storing unit.

FIG. 17 is an exemplary processing block chart of the information processing apparatus of the embodiment.

FIG. 18 is an exemplary sequence chart of a process in which a capability is previously registered.

FIG. 19 is an exemplary image chart of a capability information administrating screen.

FIG. 20 is an exemplary image chart of a capability information screen.

DETAILED DESCRIPTION OF THE PREFERRED EMBODIMENTS

A description is given below, with reference to the FIG. 1 through FIG. 20 of embodiments of the present invention. Where the same reference symbols are attached to the same parts, repeated description of the parts is omitted.

Reference symbols typically designate as follows:
1 information processing system;
10, 10A: information processing apparatus;
20: firewall(FW);
21: PC;

22: image forming apparatus;
22A, 22B: multifunction peripheral(MFP);
23: meeting system;
24: image projecting apparatus;
24A, 24B: projector;
25: IC recorder;
26, 26A, 26B: mobile terminal;
27: new device;
30: application;
31: scan transmitting application;
32: projector projecting application;
33: pull printing application;
34: new application;
40: platform;
41: device controlling service;
42: capability acquiring service;
43: OCR service;
44: file conversion service;
45: new service;
46: network interface;
47: application administrating unit;
48: service administrating unit;
49: memory controlling unit;
50: device capability storing unit;
51: capability registering unit;
55: Application Programming Interface (API);
60: storage server;
101: input device;
102: display device;
103: outside I/F;
103a: recording medium;
104: RAM;
105: ROM;
106: CPU;
107: communication I/F;
108: HDD;
200: capability information administrating screen;
210: capability information screen;
B: bus; and
N1, N2: network.

A description is given below, with reference to the FIG. 1 through FIG. 20 of embodiments of the present invention.

[First Embodiment]

(System Structure)

Figure 1:
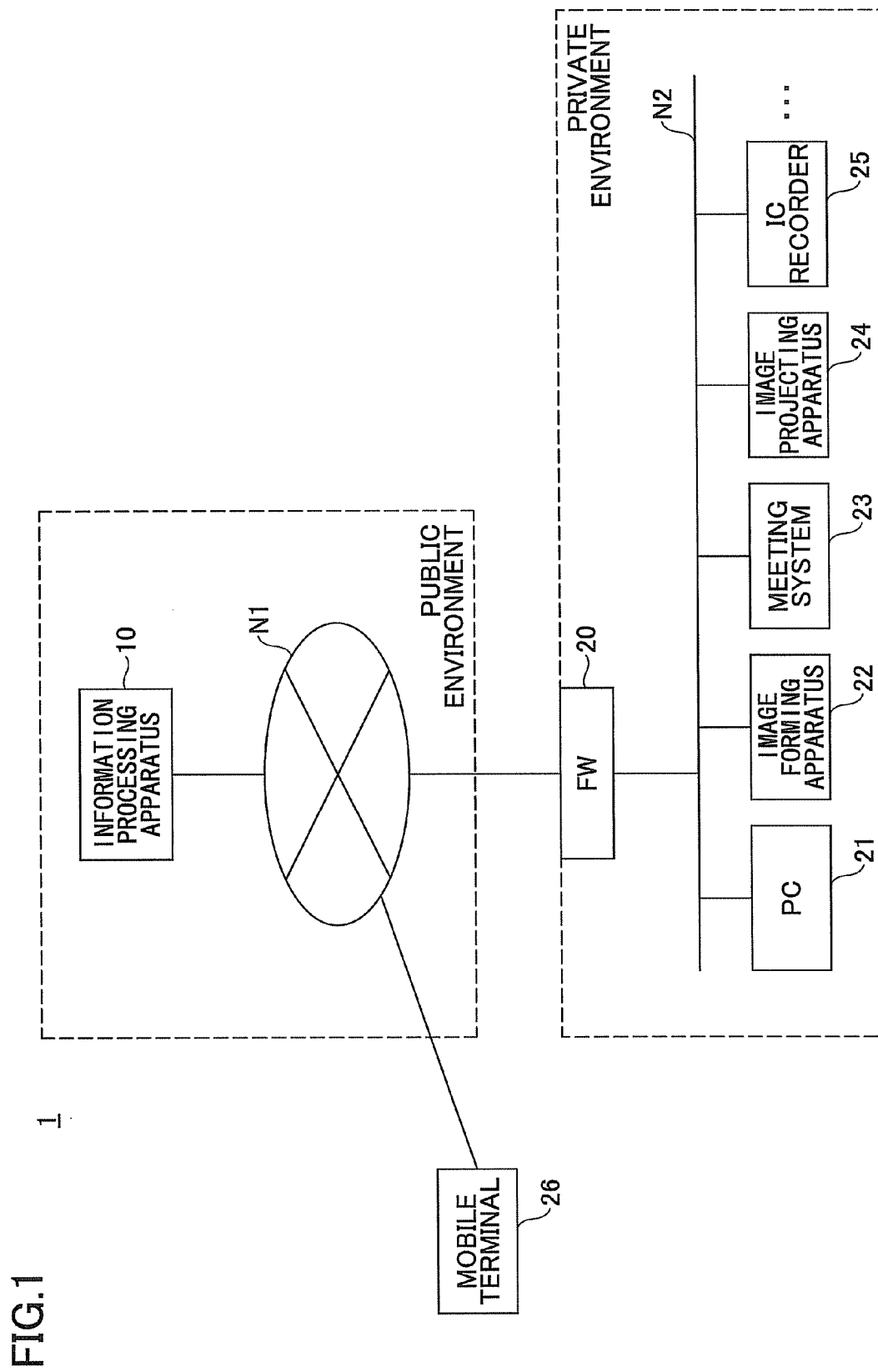
FIG. 1 is an exemplary structure of an information processing system of an embodiment.

FIG. 1 is an exemplary structure of an information processing system of the first embodiment. The information processing system 1 illustrates a structure in which an information processing apparatus 10 and a mobile terminal 26 are connected to a network N1 in a public environment such as the Internet. Further, the illustrated information processing system 1 has an exemplary structure in which a PC 21, an image forming apparatus 22, a meeting system 23, an image projecting apparatus 24, and an IC recorder 25 are connected to a network N2 under a private environment such as a Local Area Network (LAN). The mobile terminal 26 may be connected to the network N2.

The network is, for example, an intranet of an enterprise (a client). The information processing system 1 illustrates an exemplary structure in which the network N2 is connected to the network N1 via a firewall (FW) 20. A cloud computing environment is an exemplary public environment.

The PC 21 connected to the network N2, the image forming apparatus 22, the meeting system 23, the image projecting apparatus 24, and the IC recorder 25 are examples of an electronic device connected to the information processing apparatus 10. The PC 21 is a personal computer as an example of an information processing terminal. The image forming apparatus 22 is a multifunction peripheral (MFP), a printer, a scanner, or the like, which realizes one or more functions among functions of printing, reading, faxing, or the like.

The meeting system 23 provides a communication function such as voice, video or the like, and supports a meeting held among users in separate locations. The image projecting apparatus 24 has a function of projecting an image. For example, the image projecting apparatus 24 is a projector. The IC recorder 25 converts voice to an electronic signal and stores as data.

The information processing apparatus 10 performs a collaboration process by which an installed application collaborates with an electronic device such as a personal computer (PC) 21, an image forming apparatus 22, a meeting system 23, an image projecting apparatus 24, an IC recorder 25, or the like. Then, the service is provided. The information processing apparatus 10 can be distributed to plural computers. Further, the information processing apparatus 10 can be arranged in a cloud computing environment.

A mobile terminal 26 is an example of a terminal device operated by a user who uses a service provided by the information processing apparatus 10. The mobile terminal 26 may be any one of modes such as a smart phone, a portable phone, a tablet PC, a personal digital assistance (PDA), or the like.

The electronic apparatus such as the PC 21, the image forming apparatus 22, the meeting system 23, the image projecting apparatus 24, and the IC recorder 25 and the mobile terminal 26 can access the information processing apparatus 10. The information processing apparatus 10 receives a request from the image forming apparatus 22, the meeting system 23, the image projecting apparatus 24, and the IC recorder 25 and a mobile terminal 26. The information processing apparatus 10 performs a collaboration process of collaborating with one or more electronic devices (using one or more information processing apparatuses 10) to provide the service.

<Hardware Structure>

Figure 2:
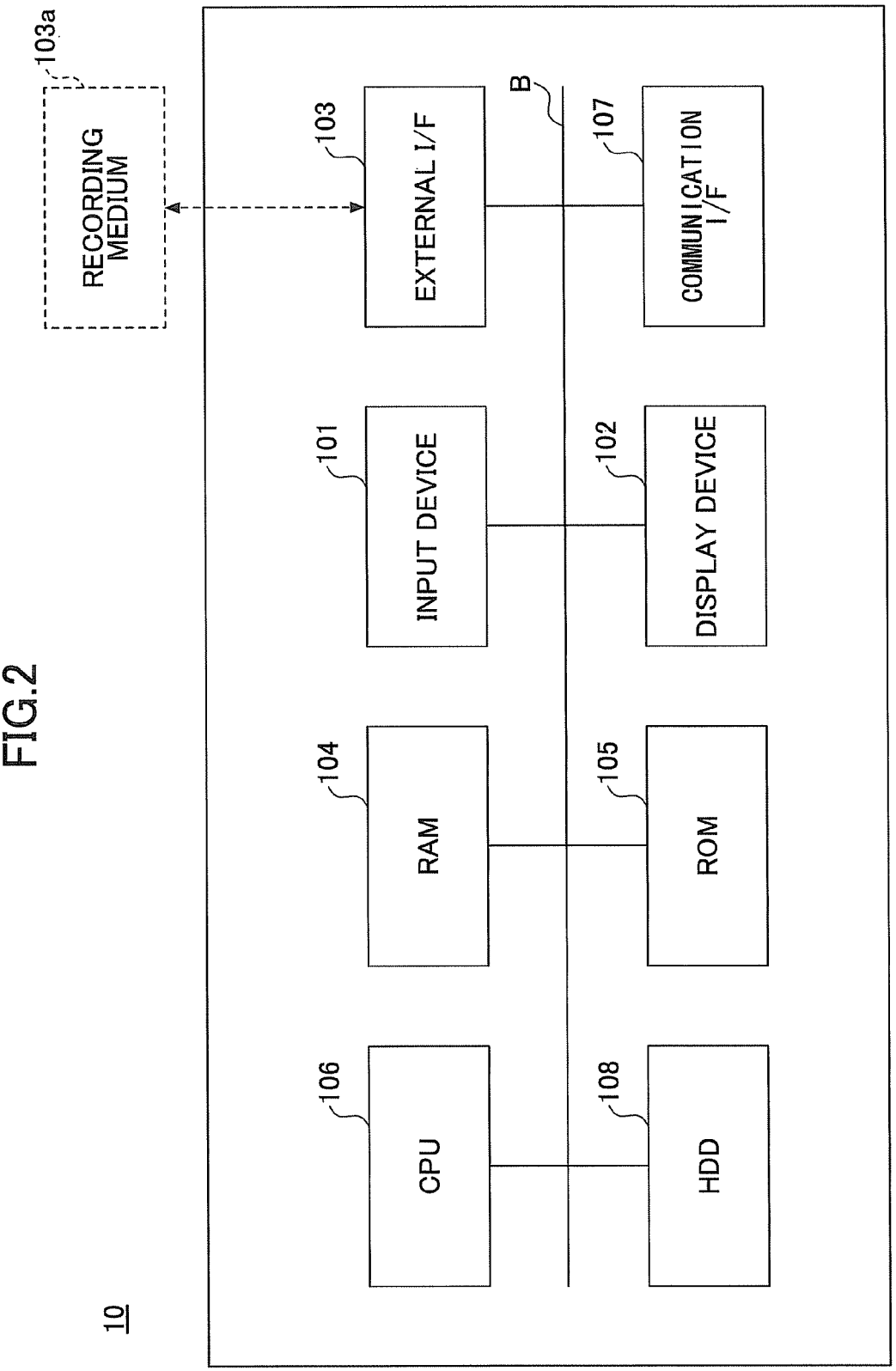
FIG. 2 is an exemplary hardware structure of an information processing apparatus of the embodiment.

For example, the information processing apparatus 10 is realized by a hardware structure illustrated in FIG. 2. FIG. 2 is an exemplary hardware structure of the information processing apparatus of the embodiment. The information processing apparatus 10 includes an input device 101, a display device 102, an external I/F 103, a RAM 104, a ROM 105, a CPU 106, a communication I/F 107, a HDD 108, and so on.

The input device 101 may include a keyboard and a mouse used to input various operation signals to the information processing apparatus 101. The display device 102 includes a display or the like to display a processing result obtained by the information-processing apparatus 10.

The communication I/F 107 is provided to connect the information processing apparatus 10 with the network N1. With this, the information processing apparatus 10 can conduct data communication with the electronic devices such as the PC 21, the image forming apparatus 22, the meeting system 23, the image projecting apparatus 24, and the IC recorder 25 and the mobile terminal 26.

The HDD 108 is a non-volatile memory device storing various programs and data. The stored program and data are an operating system (OS) which is basic software controlling the entire information processing apparatus 10, application software providing various functions in the OS, and so on. The HDD 108 manages the stored program and data with a predetermined file system and/or a data base (DB).

The external I/F 103 is an interface with the external device. The external device is a recording medium 103a and so on. With this, the image processing apparatuses 10 can read information from the recording medium 103a and/or write information to the recording medium 103a via the external I/F 103. The recording medium 103a includes a flexible disk, a CD, a Digital Versatile Disk (DVD), an SD Memory card, a Universal Serial Bus (USB) memory, or the like.

The ROM 105 is a non-volatile semiconductor memory (memory device) which can hold program and/or data even when the ROM 105 is powered off. The ROM 105 stores programs and data such as Basic Input/Output System (BIOS), OS setup, network setup or the like, which are executed at a time of starting up the information processing apparatus 10. The RAM 104 is a volatile semiconductor memory (memory device) temporally storing programs and/or data.

The CPU 106 reads the program and/or data from the memory device such as the ROM 105, the HDD 108, or the like. The read program or data undergo the process to thereby realize an entire control or functions of the information processing apparatus 10.

The information processing apparatus 10 exercises various processes described below with the above hardware structure.

<Software Structure>

Figure 3:
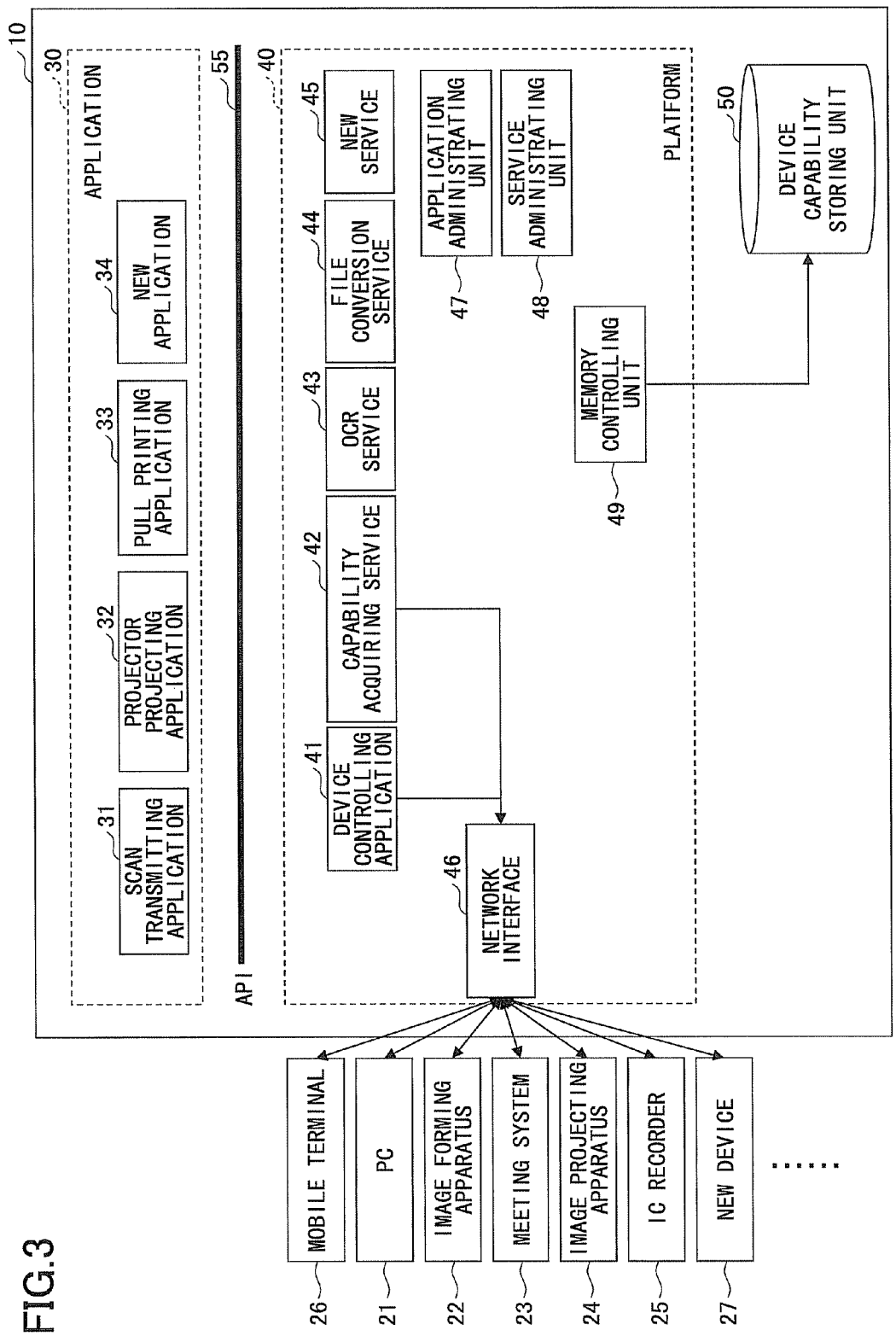
FIG. 3 is an exemplary hardware structure of an information processing block of the information processing apparatus of the embodiment.

The information processing apparatus 10 of the embodiment is realized by the processing block illustrated in, for example, FIG. 3. FIG. 3 is an exemplary processing block chart of the information processing apparatus of the embodiment. The information processing apparatus 10 executes the program to realize an application 30, a platform 40, a device capability storing unit 50, and an Application Programming Interface (API) 55.

A mode of classifying software and various memory units illustrated in FIG. 3 is an example. It is not necessary that the software and various memory units of the information processing apparatus 10 are classified into a hierarchy illustrated in FIG. 3. Said differently, if the electronic device can collaborate with the application 30, software in the information processing apparatus, a hierarchy relationship of the memory unit, or the like is not specifically limited.

(Application 30)

For example, an application 30 includes a scan transmitting application 31, a projector projecting application 32, a PULL printing application 33, and a new application 34. The new application 34 represents a possible addition of a new application to the application 30. The application 30 is, for example, a Software as a Service (SaaS) or the like.

The scan transmitting application 31, the projector projecting application 32, the PULL printing application 33, and the new application 34 are examples of applications collaborating with one or more electronic devices such as the PC 21, the image forming apparatus 22, the meeting system 23, the image projecting apparatus 24, the IC recorder 25, or the like.

The scan transmitting application 31 provides, a scan transmitting service described below. The projector projecting application 32 provides a projector projecting service described below. The PULL printing application 33 provides a PULL print service described below. The new application 34 provides any service.

These applications can be added, deleted, or changed for each application.

<<API 55>>

For example, the API 55 is an interface for the application 30 such as the scan transmitting application 31, the projector projecting application 32, the PULL printing application 33, the new application 34, or the like to use the platform 40. The API 55 is an interface previously defined so that a request from the application 30 is received by the platform 40. The API 55 is structured by a function, a class, or the like.

For example, the API 55 includes a capability acquiring API, an execution controlling API, and a processing service execution API.

The capability acquiring API is a previously defined interface for receiving an acquisition request for, for example, information related to the capability of the electronic device (capability) from the application 30. Here, the capability acquiring API may be a single API or a group of plural APIs. In a case where the group of the plural APIs is used, an API receiving an acquisition request for requesting to acquire information related to the capability of the electronic device and an API receiving an acquisition request for simultaneously acquiring information related to the capability of the plural electronic devices may be defined separately.

The execution controlling API is a previously defined interface for receiving an execution request for a predetermined process, which is generated by the application 30 based on, for example, information related to the capability of the electronic device. Here, the execution controlling API may be a single API or a group of plural APIs. In a case where the execution controlling API is the group of plural APIs, it is possible to define the execution controlling API as different APIs mutually different for each process of scanning, printing, and projecting.

The processing service execution API is a previously defined interface for receiving an execution request for causing a service, which are provided by, for example, the platform 40 such as an OCR service 43 or a file conversion service, to conduct from the application 30. Here, the processing service execution API may be a single API or a group of plural APIs. In a case where the processing service execution API is the group of plural APIs, it is possible to define the processing service execution API as different APIs mutually different for each service of, for example, an OCR service 43 and a file service 44.

In a case where the information processing apparatus 10 is distributed to plural computers, the API 55 can be, for example, a Web API which can be used via a network. The example of the API 55 is described later.

Further, the API 55 of the information processing apparatus 10 can be provided as a Software Development Kit (SDK) to a developer of the application 30. The developer of the application 30 can develop the application 30 using the SDK. Further, the SDK can be provided to a third vendor other than a provider of the information processing apparatus 10. The third vendor can develop the application 30 using the provided SDK. The application developed using the SDK can be installed in the information processing apparatus 10 as the new application 34. As described, by providing the API 55 of the information processing apparatus 10 as the SDK, not only an application developed by a provider of the information processing apparatus 10 but also an application developed by a third vendor can be installed in the information processing apparatus 10.

<<Platform 40>>

The platform 40 includes a device controlling service 41, a capability acquiring service 42, an OCR service 43, a file conversion service 44, a new service 45, a network interface 46, an application administrating unit 47, a service administrating unit 48, and a memory controlling unit 49, as an example. The new application 45 indicates a possible addition of a new service to the platform 40.

The device controlling service 41 performs a predetermined process based on an execution request received from the application 30 in the execution controlling API while collaborating with one or more electronic devices such as the PC 21, image forming apparatus 22, a meeting system 23, an image projecting apparatus 24, an IC recorder 25, or the like. The device controlling service 41 determines whether a part of the predetermined process based on the execution request is executed in the platform 40. After it is determined that a part of the predetermined process is executed in the platform 40, the device controlling service 41 executes the predetermined process based on the execution request while the processing service such as the OCR service 43 or the file conversion service 44 collaborates with one or more electronic devices.

The capability acquiring service 42 sends the capability of the electronic device corresponding to a capability acquiring request, which is received from the application 30 by the capability acquiring API, to the application 30 on the source of the capability acquiring request. The capability acquiring service 42 acquires the capability of the electronic device corresponding to the capability acquiring request from the electronic device corresponding to the capability acquiring request.

The capability acquiring service 42 acquires the capability of the electronic device corresponding to the capability acquiring request from the device capability storing unit 50 via a memory controlling unit 49 described below if the capability of the electronic device corresponding to the capability acquiring request is not acquired from the electronic device corresponding to the capability acquiring request.

The capability acquiring service 42 may determine whether the capability of the electronic device corresponding to the capability acquiring request from the electronic device corresponding to the capability acquiring request or from the device capability storing unit 50 via the memory controlling unit 49 based on the predetermined condition. As the determination based on the predetermined condition, the capability of the electronic device corresponding to the capability acquiring request may be acquired from the electronic device if an elapsed time after the capability is stored in the device capability storing unit 50 exceeds a predetermined time (predetermined days).

The capability acquiring service 42 may be previously set whether the capability of the electronic device corresponding to the capability acquiring request is acquired from the electronic device corresponding to the capability acquiring request or from the device capability storing unit 50 via the memory controlling unit 49.

The OCR service executes a OCR function. The file conversion service 44 performs a format converting function represented by an image conversion. Further, the new service 45 executes any one of the functions. The OCR service 43 and the file conversion service 44 execute services (processes related to a collaborate process) based on the execution request received from the application 30 in the processing service execution API.

The network interface 46 is an interface for connecting to the network N1. The network interface 46 intermediates among the administrator terminal, the electronic device such as the device controlling service 41, the capability acquiring service 42, the PC 21, the image forming apparatus 22, the meeting system 23, the image projecting apparatus 24, the IC recorder 25, and the new device 27, and the mobile terminal 46. The new device 27 represents a new electronic device to be added and to be connected with the information processing apparatus 10.

The application administrating unit 47 manages an addition of a new application or the like to the application 30, and a deletion or a change of a scan transmitting application 31 or the like. Further, the service administrating unit 48 administrates an addition of the new service 45 or the like to the platform 40, and a deletion, a change or the like of the OCR service 43, which is already installed, or the like.

The memory controlling unit 49 causes the capability of the one or more electronic devices to store into the device capability storing unit 50. Further, the memory controlling unit 49 causes the capability, which is acquired by the capability acquiring service 42, to be stored in the device capability storing unit 50. The memory controlling unit 49 sends the capability acquired from the device capability storing unit 50 based on the capability acquiring request acquired from the capability acquiring service 42.

<<Device Capability Storing Unit 50>>

The memory controlling unit 49 causes the capability of the one or more electronic devices to store into the device capability storing unit 50. The device capability storing unit 50 reads the capability of the one or more electronic device by a control of the memory controlling unit 49 and provides it to the memory controlling unit 49.

The capability stored in the device capability storing unit 50 is information related to at least one of an input, an output, or a process of the electronic device, as described later.

<Detailed Process>

Hereinafter, a detailed process of the information processing system 1 of the embodiment is described.

<<Process in Scan Transmitting Application 31>>

Here, as an example of the process of the scan transmitting application 31, a scan transmission process is described. In the scan transmission process, an original is scanned, the scanned image data undergoes an OCR process, and the image data and the OCR data are stored in the storage server 60. The storage server 60 is an example of a memory device for recording the image data and the OCR data. The image data and the OCR data may be recorded in an HDD 108 of the information processing apparatus 10 instead of the storage server 60.

Figure 4:
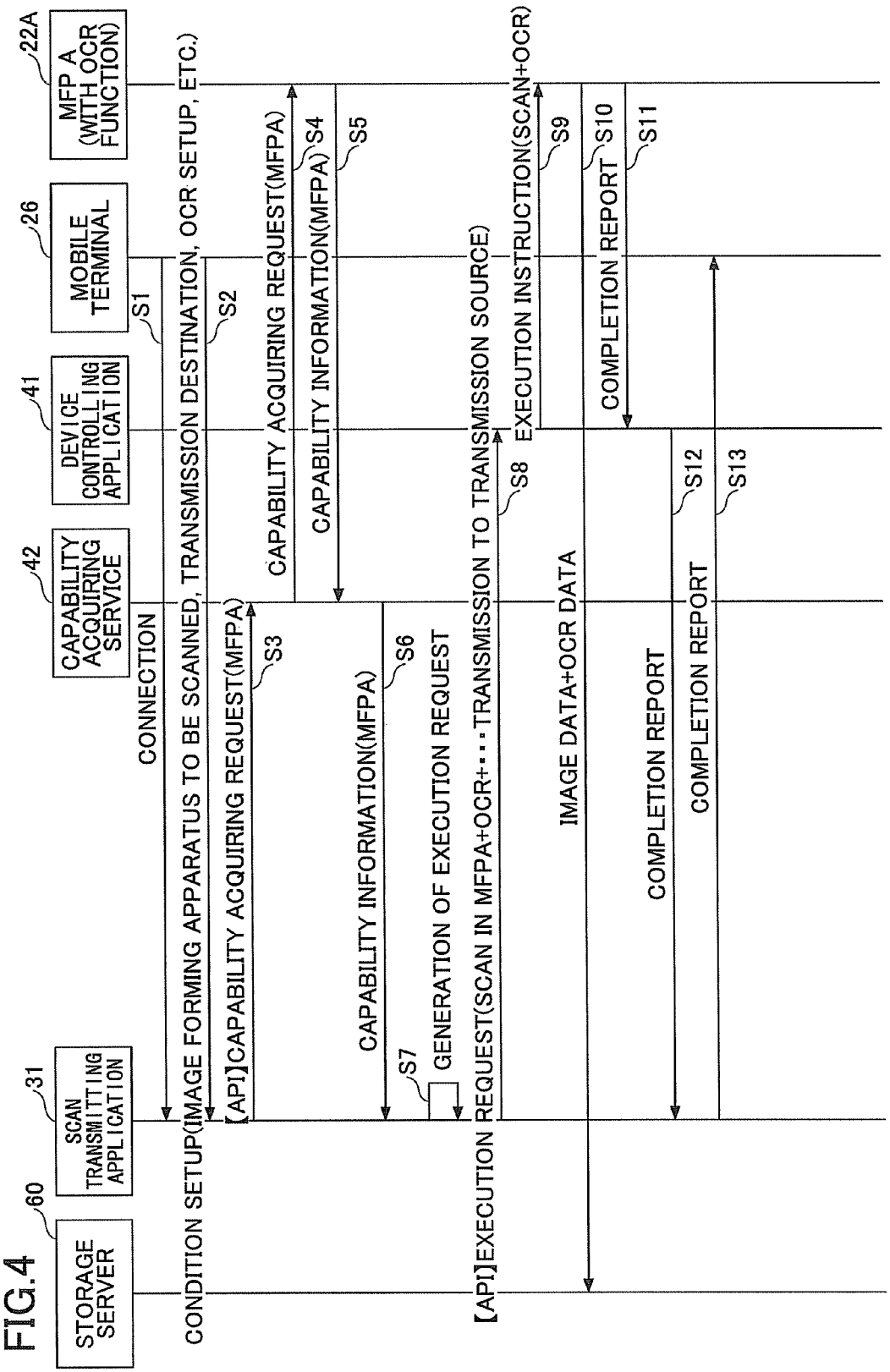
FIG. 4 is an exemplary sequence chart of a scan transmission process using a MFP having an OCR function.

FIG. 4 is an exemplary sequence chart of a scan transmission process using a MFP with an OCR function. The user operates the mobile terminal 26 and selects the scan transmission process. When the scan transmission process is selected by the user, the mobile terminal 26 is connected to the scan transmitting application 31 of the information processing apparatus 10 in step S1.

In step S2, the mobile terminal 26 instructs to set conditions of an image forming apparatus, a transmission destination, an OCR setup, or the like to the scan transmitting application 31. Here, an exemplary condition setting is that the image forming apparatus to be scanned is a MFP 22A and the transmission destination is the storage server 60.

In step S3, the scan transmitting application 31 sends the capability acquiring request for the MFP 22A to the capability acquiring service 42 via the capability acquiring API. In step S4, the capability acquiring service 42 sends the capability acquiring request to the MFP 22A in response to the capability acquiring request received via the capability acquiring API.

As in the information processing system 1 illustrated in FIG. 1, in a case where the network N2 is connected to the network N1 via the firewall 20, a request cannot be sent from the information processing apparatus 10 to the MFP 22A. In a case where the network N2 is connected to the network N1, the electronic device such as the image forming apparatus 22 conducts polling to the information processing apparatus 10 so that a request from the information processing apparatus 10 can be received.

In a case where the network N2 is connected to the network N1, the electronic device such as the image forming apparatus 22 connected to the network N2 can communicate with the information processing apparatus 10 by using an Extensible Messaging and Presence Protocol (XMPP). In the XMPP, there is a technique called a Bidirectional-streams Over Synchronous HTTP (BOSH) for sending and receiving messages of HTTP. By using BOSH, the information processing apparatus 10 can realize a Push function (a function that does not cause to receive a request from an electronic device and sends a request from the information processing apparatus 10 to the electronic device out of synchronism with the request), which is not ordinarily provided.

As such, a problem that the request cannot be sent from the information processing apparatus 10 to the electronic device connected to the network N2 beyond the firewall 20 can be solved by the above described conventional technique. Hereinafter, a description is given on a premise that the request can be sent from the information processing apparatus 10 to the electronic device such as the MFP 22A.

In step S5, the capability acquiring service 42 receives the capability of the MFP 22A from the MFP 22A. In step S6, the capability acquiring service 42 sends the capability of the MFP 22A to the scan transmitting application 31 at the capability acquiring request source. In this case, the capability acquiring service 42 instructs the memory controlling unit 49 to store the capability of the MFP 22A received in step S5 so that the capability of the MFP 22A is stored in the device capability storing unit 50. By causing the device capability storing unit 50 to store the capability of the acquired MFP 22A, even in cases where the capability fails to be sent or a request for resending the capability of the MFP 2A is received, it is not necessary to acquire the capability from the MFP 22A again.

In step S7, the scan transmitting application 31 determines that the MFP 22A has the OCR function based on the received capability of the MFP 22A. The scan transmitting application 31 generates an execution request, by which the MFP 22A scans the original, the scanned image data undergo OCR, and cause the image data and the OCR data to be sent to the storage server 60. In step S8, the scan transmitting application 31 sends the execution request generated in step S7 to the device controlling service 41 via an execution controlling API.

In step S9, the device controlling service 41 instructs the MFP 22A to scan the original, perform an OCR process of the scanned image data, and send the image data and the OCR data to the storage server 60 based on the execution request received via the execution controlling API. The MFP 22A scans the original and performs an OCR process of the scanned image data. In step S10, the MFP 22A performs a transmission process of sending the image data and the OCR data to the storage server 60. In steps S11 to S13, a completion report is sent from the MFP 22A to the mobile terminal 26 via the device controlling service 41 and the scan transmitting application 31.

According to the sequence chart illustrated in FIG. 4, the information processing apparatus 10 can determine the MFP 22A has an OCR function based on the capability acquired from the MFP 22A. Therefore, the MFP 22A can cause the MFP 22A to scan the original, to perform the OCR process of the scanned image data, and to send the image data and the OCR data to the storage server 60.

Figure 5:
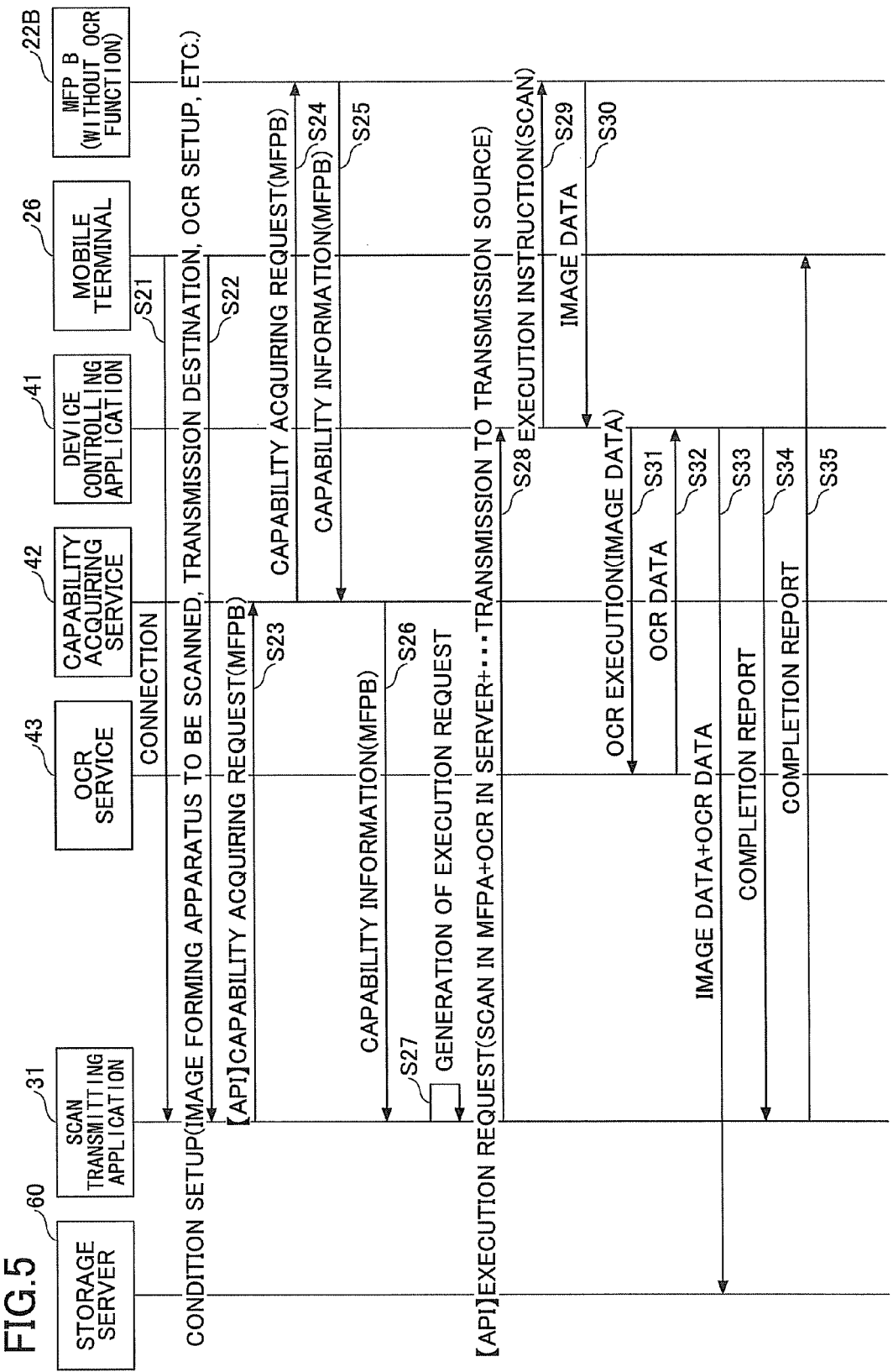
FIG. 5 is an exemplary sequence chart of a scan transmission process using a MFP without an OCR function.

FIG. 5 is an exemplary sequence chart of a scan transmission process using a MFP without an OCR function. Because FIG. 5 is similar to the sequence chart illustrated in FIG. 4 except for a part of FIG. 5, the explanation is appropriately omitted.

When the scan transmission process is selected by a user in the mobile terminal 26, the mobile terminal 26 is connected to the scan transmitting application 31 in step S21. In step S22, the mobile terminal 26 instructs the scan transmitting application to set conditions of a MFP 22B for scanning, the storage server 60 at the transmission destination, the OCR, or the like to the scan transmitting application 31. In steps S23 to S26, the scan transmitting application 31 receives the capability of the MFP 22B. The processes of steps S23 to S26 correspond to the processes of steps S3 to S6.

In step S27, the scan transmitting application 31 determines that the MFP 22B does not have the OCR function based on the received capability of the MFP 22B. The scan transmitting application 31 generates an execution request for causing the MFP 22A to scan the original, the MFP 22A to send the scanned image to the device controlling service 41, the OCR service 43 to perform the OCR process of the scanned image data, and the platform 40 to send the image data and the OCR data to the storage server 60. In step S28, the scan transmitting application 31 sends the execution request generated in step S27 to the device controlling service 41 via the execution controlling API.

In step S29, the device controlling service 41 instructs the MFP 22B to execute scanning of the original and to send the scanned image data to the device controlling service 41 based on the execution request received from the scan transmitting application 31 via the execution controlling API. The MFP 22B scans the original based on the execution instruction from the device controlling service 41. In step S30, the MFP 22B sends the scanned image data to the device controlling service 41.

In step S31, the device controlling service 41 instructs the OCR service 43 to perform the OCR process of the scanned image data. The OCR service 43 performs the OCR process of the scanned image data based on the execution instruction from the device controlling service 41. In step S32, the OCR service 43 sends the OCR data obtained by performing the OCR process to the device controlling service 41. In step S33, the device controlling service 41 performs a transmission process of sending the image data and the OCR data to the storage server 60 based on the execution request received from the scan transmitting application 31 via the execution controlling API. In steps S34 to S35, a completion report is sent from the device controlling service 41 to the mobile terminal 26 via the scan transmitting application 31.

Referring to the sequence chart of FIG. 5, the scan transmitting application 31 can determine that the MFP 22B does not have the OCR function based on the capability acquired from the MFP 22B. Therefore, the scan transmitting application 31 causes the MFP 22A to scan the original and to perform a transmission process of sending the scanned image data to the device controlling service 41.

Thus, it is possible to cause the platform 40 to perform a transmission process of sending the image data and the OCR data to the storage server 60.

Figure 6:
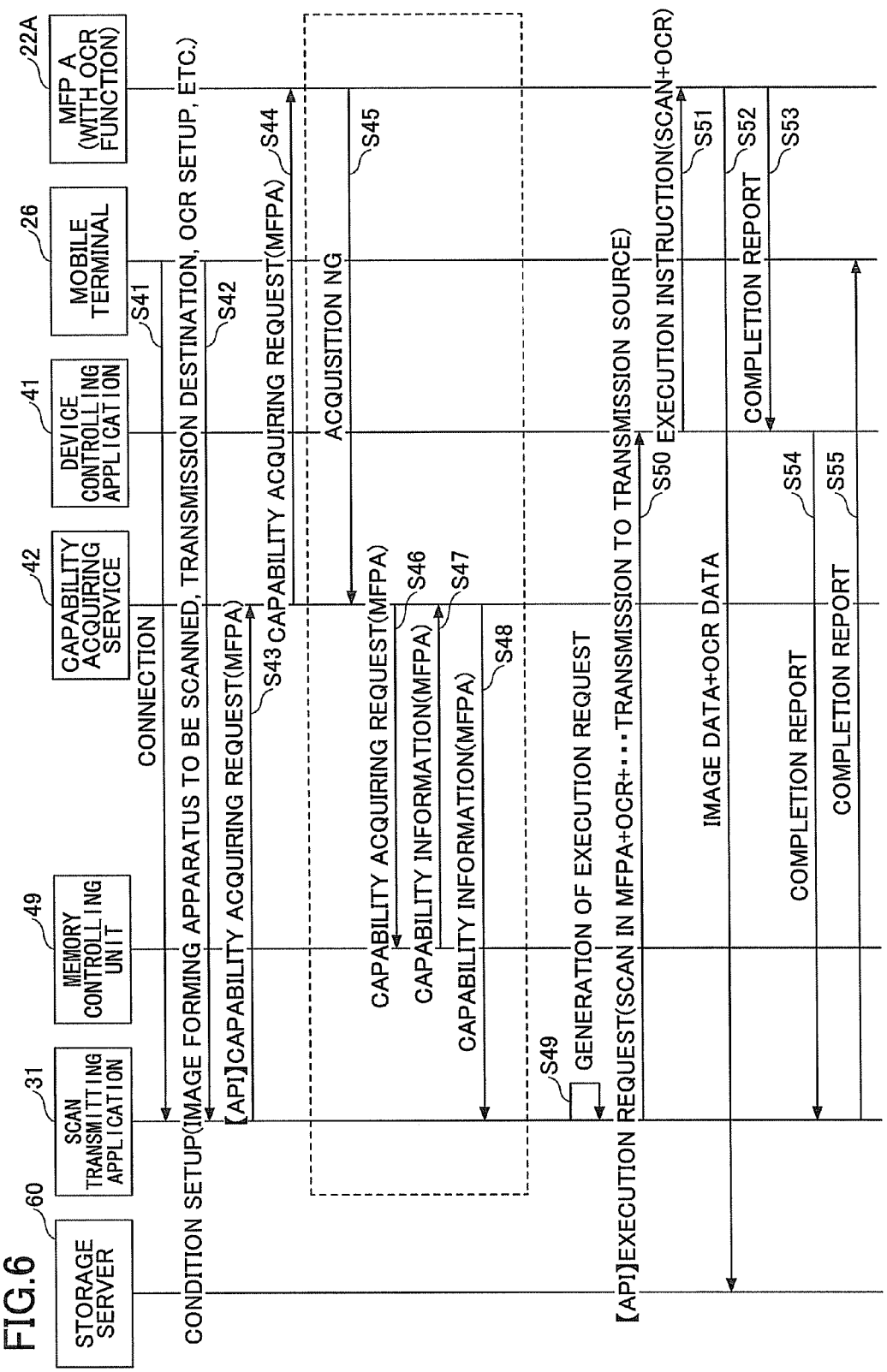
FIG. 6 is an exemplary sequence chart of a scan transmission process in which a capability cannot be acquired from a MFP.

FIG. 6 is an exemplary sequence chart of a scan transmission process in which a capability cannot be acquired from a MFP. Because FIG. 6 is similar to the sequence chart illustrated in FIG. 4 except for a part of FIG. 6, the explanation is appropriately omitted.

Because the processes of steps S41 to S44 are similar to the processes of steps S1 to S4, explanation is omitted. In step S45, the capability acquiring service 42 cannot receive the capability of the MFP 22A from the MFP 22A. Said differently, the capability acquiring service 42 fails to acquire the capability from the MFP 22A.

In step S46, since the capability acquiring service 42 fails to acquire the capability from the MFP 22A, the capability acquiring service 42 sends the capability acquiring request for the MFP 22A to the memory controlling unit 49. The memory controlling unit 49 acquires the capability of the MFP 22A from the device capability storing unit 50. In step S47, the capability acquiring service 42 receives the capability of the MFP 22A from the memory controlling unit 49. In step S48, the capability acquiring service 42 sends the capability of the MFP 22A to the scan transmitting application 31 at the capability acquiring request source. Because the processes of steps S49 or later are similar to the processes of steps S7 or later, explanation is omitted.

Referring to the sequence chart of FIG. 6, even though the information processing apparatus 10 fails to acquire the capability from the MFP 22A, the information processing apparatus 10 can determine that the MEP 22A has the OCR function based on the capability acquired from the device capability storing unit 50. Therefore, the information processing apparatus 10 can cause the MFP 22A to scan the original and to perform the OCR process of processing the scanned image data, and to perform the transmission process of sending the image data and the OCR data to the storage server 60.

Figure 7:
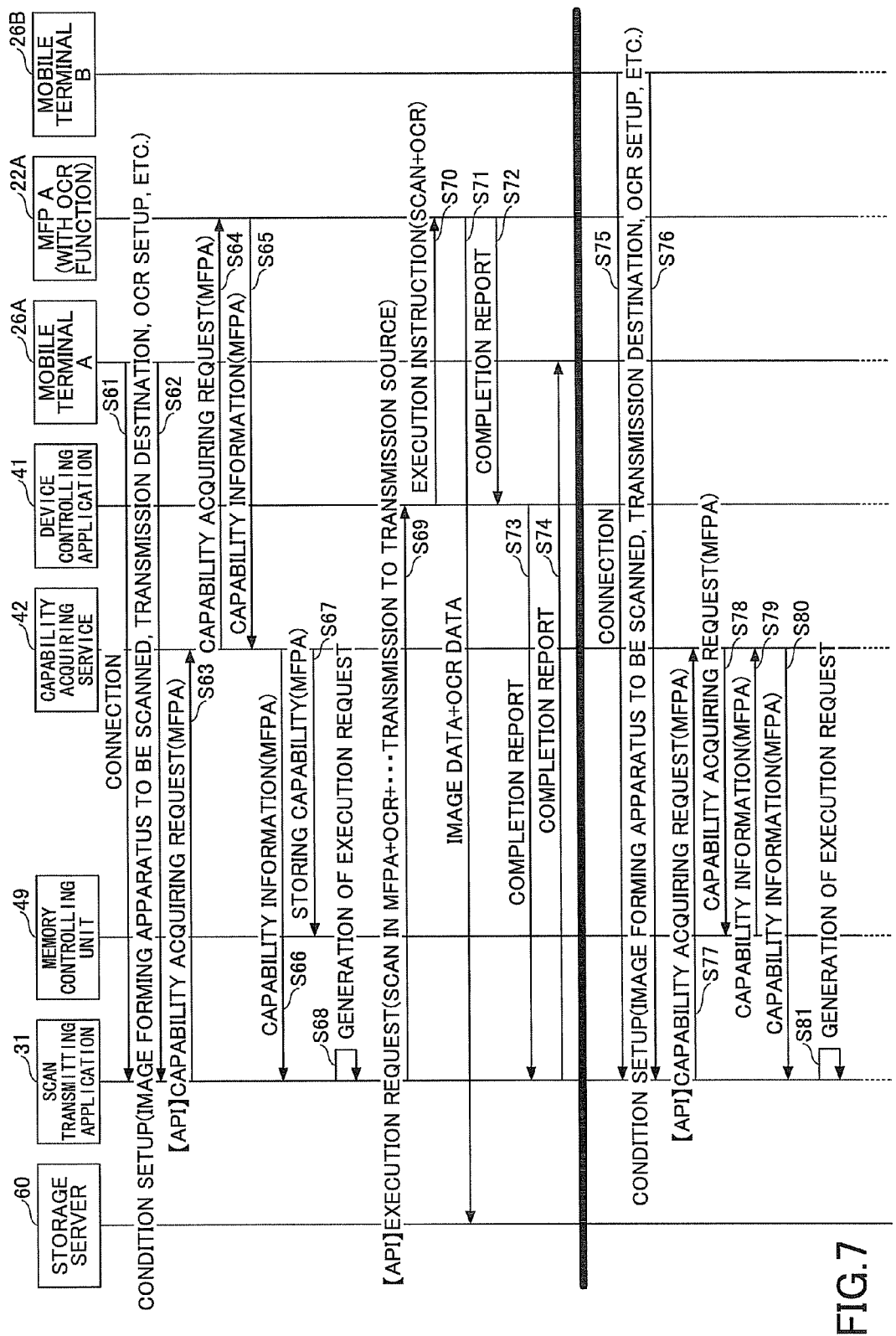
FIG. 7 is an exemplary sequence chart of a scan transmission process in which an acquisition source of the capability is determined.

FIG. 7 is an exemplary sequence chart of a scan transmission process in which an acquisition source of the capability is determined. Because FIG. 7 is similar to the sequence chart illustrated in FIG. 4 except for a part of FIG. 7, the explanation is appropriately omitted.

Because the processes of steps S61 to S66 are similar to the processes of steps S1 to S6, explanation is omitted. In step S67, the capability acquiring service 42 instructs the memory controlling unit 49 to store the capability of the MFP 22A received in step S65. The memory controlling unit 49 causes the device capability storing unit 50 to store the capability of the MFP 22A into the device capability storing unit 50.

Because the processes of steps S68 to S74 are similar to the processes of steps S7 to S13, explanation is omitted. Although the processes of steps S61 to S74 are started from a mobile terminal 26A, the processes of step S75 or later are started from a mobile terminal 26B different from the mobile terminal 26A.

In step S75, the scan transmitting application 31 of the information processing apparatus 10 is connected from the mobile terminal 26B. In step S76, the mobile terminal 26B instructs the scan transmitting application 31 to set conditions of the MFP 22A for scanning, the storage server 60 at the transmission destination, the OCR, or the like to the scan transmitting application 31.

In step S77, the scan transmitting application 31 sends the capability acquisition request for the MFP 22A to the capability acquiring service 42 via the capability acquiring API. The capability acquiring service 42 determines whether the capability of the MFP 22A is acquired from the MFP 22A or from the device capability storing unit 50 via the memory controlling unit 49 based on predetermined conditions.

For example, the capability acquiring service 42 may determine that the capability of the MFP 22A is acquired from the MFP 22A if an elapsed time after the capability of the MFP 22A is stored in the device capability storing unit 50 exceeds a predetermined time. For example, the capability acquiring service 42 may determine that the capability of the MFP 22A is acquired from the device capability storing unit 50 if the elapsed time after the capability of the MFP 22A is stored in the device capability storing unit 50 does not exceed the predetermined time.

Here, the explanation is given on the premise that the capability acquiring service 42 acquires the capability of the MFP 22A from the device capability storing unit 50. In step S78, the capability acquiring service 42 sends a capability acquiring request for the MFP 22A to the memory controlling unit 49. The memory controlling unit 49 acquires the capability of the MFP 22A from the device capability storing unit 50.

In step S79, the capability acquiring service 42 receives the capability of the MFP 22A from the memory controlling unit 49. In step S80, the capability acquiring service 42 sends the capability of the MFP 22A to the scan transmitting application 31 at the capability acquiring request source. Because the processes of steps S81 or later are similar to the processes of steps S7 or later, explanation is omitted.

Referring to the sequence chart of FIG. 7, the information processing apparatus 10 can determine the acquisition source of the capability of the MFP 22A from the MFP 22A or the device capability storing unit based on predetermined conditions. For example, if a relatively new capability of the MFP 22A is stored in the device capability storing unit 50, the information processing apparatus 10 can acquire the capability of the MFP 22A from the device capability storing unit 50 (not from the MFP 22A), the amount of the data communication with the MFP 22A can be reduced.

As described, according to the information processing apparatus 10 of the embodiment, the user can use the scan transmission process without considering the existence of the OCR functions of the MFPs 22A and 22B. Further, according to the information processing apparatus 10, the application 30 installed in the information processing apparatus 10 can use the platform 40 provided in the information processing apparatus 10 via the capability acquiring API and the execution controlling API. Then, the service can be provided by collaboration among the application 30 installed in the information processing apparatus 10, the platform 40 included in the information processing apparatus 10, and one or more electronic devices connected to the information processing apparatus 10.

<<Process in Pull Printing Application 33>>

Here, as an example of processes of the pull printing application 33, an explanation is given to a PDF file, which is acquired from the storage server 60, and the acquired PDF file is printed by the MFP 22A.

Figure 8:
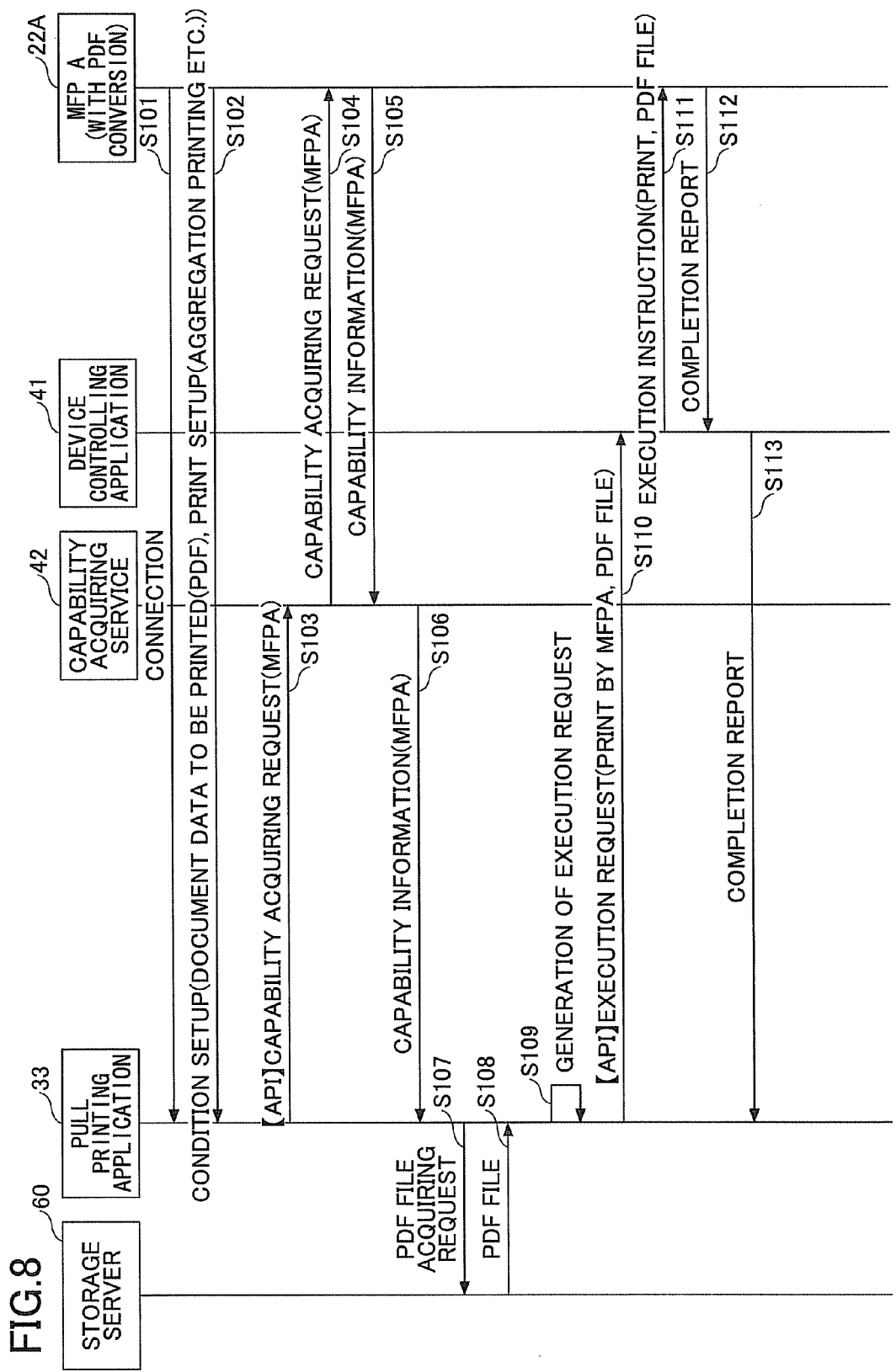
FIG. 8 is an exemplary sequence chart of a PULL print process using a MFP with a PDF conversion function.

FIG. 8 is a sequence chart of an exemplary PULL printing process using a MFP with a PDF conversion function. The user operates the MFP 22A and selects the PULL printing process. When the PULL printing process is selected, the MFP 22A connects to the PULL printing application 33 of the information processing apparatus 10 in step S101. In step S102, the MFP 22A instructs the PULL printing application 33 to set conditions such as document data (PDF) to be printed, a print setup such as aggregation printing, or the like to the PULL printing application 33.

In step S103, the PULL printing application 33 sends the capability acquisition request for the MFP 22A to the capability acquiring service 42 via the capability acquiring API. In step S104, the capability acquiring service 42 sends the capability acquiring request to the MFP 22A in response to the capability acquiring request received via the capability acquiring API.

In step S105, the capability acquiring service 42 receives the capability of the MFP 22A from the MFP 22A. In step S106, the capability acquiring service 42 sends the capability of the MFP 22A to the PULL printing application 33 at the capability acquiring request source.

In step S107, the PULL printing application 33 sends an acquisition request for document data to be printed to the storage server 60 based on the condition setting instructed from the MFP 22A. In step S108, the PULL printing application 33 receives the PDF file from the storage server 60.

In step S109, the PULL printing application 33 determines that the MFP 22A has a PDF conversion function from the capability of the MFP 22A. The PULL printing application 33 generates an execution request causing the MFP 22A to print a PDF file. In step S110, the PULL printing application 33 sends the execution request generated in step S109 to the device controlling service 41 via the execution controlling API.

In step S111, the device controlling service 41 instructs the MFP 22A to print the PDF file based on the execution request received via the execution controlling API. The MFP 22A prints the PDF file after converting it to printable data. In steps S112 to S113, the completion report is sent to the PULL printing application 33 from the MFP 22A via the device controlling service 41.

Referring to the sequence chart of FIG. 8, the information processing apparatus 10 can cause the MFP 22A to print the PDF file because the information processing apparatus 10 can determine that the MFP 22A has a PDF conversion function based on the capability of the MFP 22A.

Figure 9:
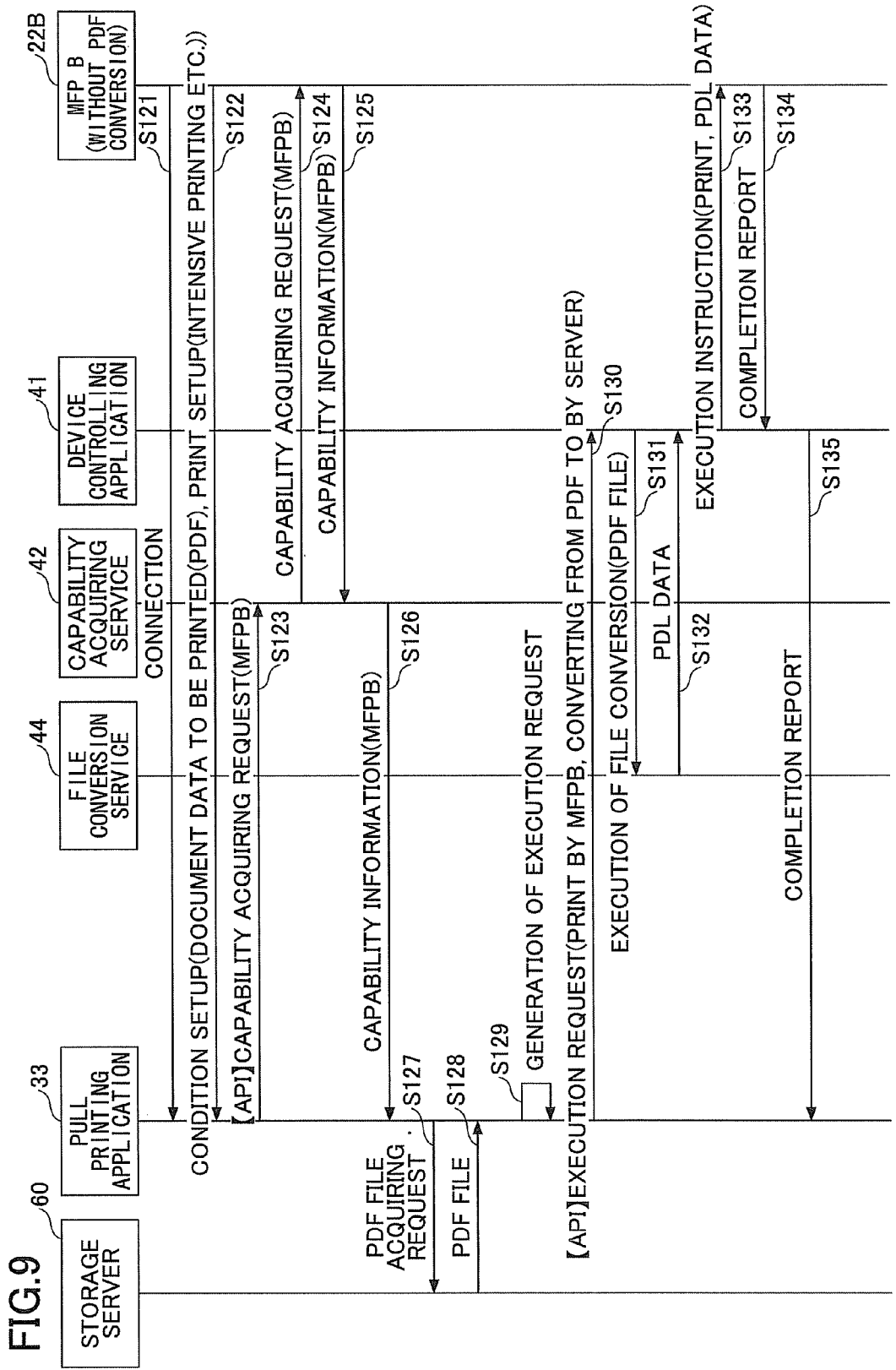
FIG. 9 is an exemplary sequence chart of a PULL print process using a MFP without a PDF conversion function.

FIG. 9 is an exemplary sequence chart of the PULL print process using a MFP without a PDF conversion function. Because FIG. 9 is similar to the sequence chart illustrated in FIG. 8 except for a part of FIG. 9, the explanation is appropriately omitted.

When the PULL printing process is selected by a user in the MFP 22B, the MFP 22B is connected to the PULL printing application 33 in step S121. In step S122, the MFP 22B instructs the PULL printing application 33 to set conditions such as a PDF file to be printed, a print setup, or the like to the PULL printing application 33. In steps S123 to S126, the PULL printing application 33 receives the capability of the MFP 22B. In steps S127 to S128, the PULL printing application 33 receives the PDF file from the storage server 60 based on the condition setting instructed from the MFP 22B.

In step S129, the PULL printing application 33 determines that the MFP 22B does not have a PDF conversion function from the capability of the MFP 22B. The PULL printing application 33 causes the file conversion service 44 to convert the PDF file to data (for example, PDL data), which can be printed by the MFP 22B, and generates an execution request causing the MFP 22B to converted print data. In step S130, the PULL printing application 33 sends the execution request generated in step S129 to the device controlling service 41 via the execution controlling API.

In step S131, the device controlling service 41 instructs the file conversion service 44 to convert the PDF file to PDL data. The file conversion service 44 executes the conversion from the PDF file to the PDL data based on the execution instruction from the device controlling service 41. In step S132, the file conversion service 44 sends the converted PDL data to the device controlling service 41.

In step S133, the device controlling service 41 instructs the MFP 22B to print the PDF file based on the execution request received from the PULL printing application 33 via the execution controlling API. The MFP 22B prints the PDL data. In steps S134 to S135, the completion report is sent to the PULL printing application 33 from the MFP 22B via the device controlling service 41.

Referring to the sequence chart of FIG. 9, the information processing apparatus 10 can determine that the MFP 22B does not have the PDF conversion function based on the capability of the MFP 22B. Then, the information processing apparatus 10 causes the file conversion service of the platform 40 to convert from the PDF file to the PDL data and causes the MFP 22B to print the PDL data.

As described, according to the information processing apparatus 10 of the embodiment, the user can use the PULL printing process without considering the existence of the PDF conversion functions of the MFPs 22A and 22B. Further, according to the information processing apparatus 10 of the embodiment, the application 30 installed on the information processing apparatus 10 can provide a service while the application 30 collaborates with the platform 40 of the information processing apparatus 10 and the one or more electronic devices connected to the information processing apparatus 10 via the capability acquiring API and the execution controlling API.

<<Process in Projector Projecting Application 32>>

Here, as an exemplary process in the projector projecting application 32, explanation is given to a projector projecting process. In the projector projecting process, the projection file may be received from the mobile terminal 26, and the received projection file is caused to be projected by the projector 24A.

Figure 10:
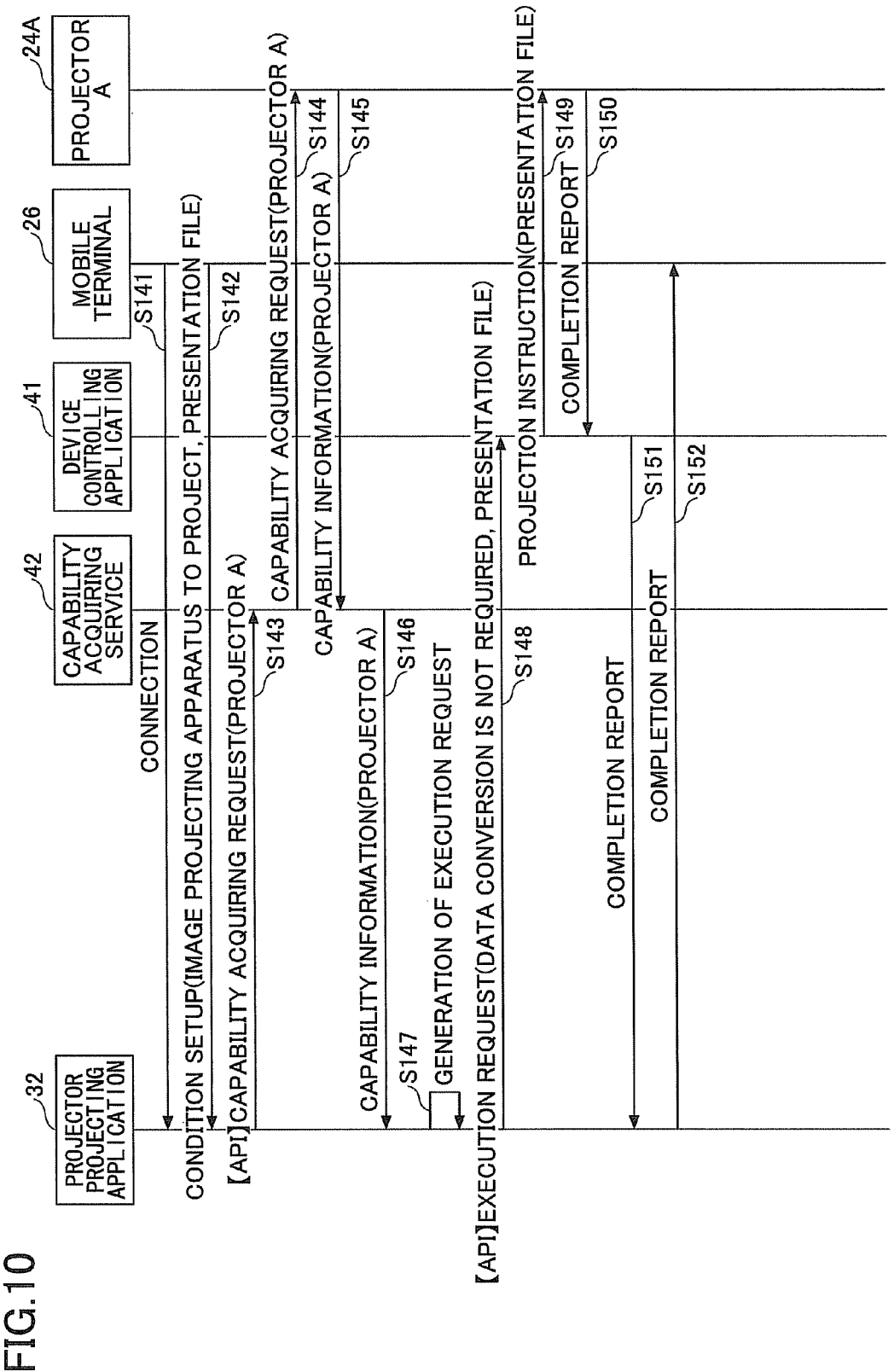
FIG. 10 is an exemplary sequence chart of a projector projecting process using a projector for projecting a projection file, which is received from a mobile terminal.

FIG. 10 is an exemplary sequence chart of the projector projecting process using the projector which can project a projection file received from a mobile terminal. The user operates the mobile terminal 26 and selects the projector projecting process. For example, when an application is installed in the mobile terminal 26, the user selects the image projecting apparatus 24, by which the projection is conducted, and a projection file to be projected on the mobile terminal 26. The mobile terminal 26 may previously acquire a list of the image projecting apparatuses 24 connected to, for example, the information processing apparatus 10.

In step S141, the mobile terminal 26 is connected to the projector projecting application 32 of the information processing apparatus 10. In step S142, the mobile terminal 26 instructs projector projecting application 32 to set conditions such as the image projecting apparatus 24, by which the projection is conducted and the projection file. Here, an exemplary condition setting is explained where the projector 24A is used as the image projecting apparatus 24 and a presentation file is made by a presentation material making application. In step S143, the projector projecting application 32 sends, the capability acquisition request for the projector 24A to the capability acquiring service 42 via the capability acquiring API.

In step S144, the capability acquiring service 42 sends the capability acquiring request to the projector 24A in response to the capability acquiring request received via the capability acquiring API. In step S145, the capability acquiring service 42 receives the capability of the projector 24A from the projector 24A. In step S146, the capability acquiring service 42 sends the capability of the projector 24A to the projector projecting application 32 at the capability acquiring request source.

In step S147, the projector projecting application 32 determines that the projector 24A can project an image format presentation file (for each image file type) based on the received capability of the projector 24A. The projector projecting application 32 generates an execution request for causing the projector 24A to project a presentation file. In step S148, the projector projecting application 32 sends the execution request generated in step S147 to the device controlling service 41 via the execution controlling API.

In step S149, the device controlling service 41 instructs the projector 24A to project the presentation file based on the execution request received via the execution controlling API. The projector 24A executes a projection process for projecting the presentation file. In steps S150 to S152, a completion report is sent from the projector 24A to the mobile terminal 26 via the device controlling service 41 and the projector projecting application 32.

Referring to the sequence chart of FIG. 10, the information processing apparatus 10 can cause the projector 24A to execute the projection process of projecting the presentation file because it is possible to determine that the projector 24A can project the presentation file based on the capability of the projector 24A.

Figure 11:
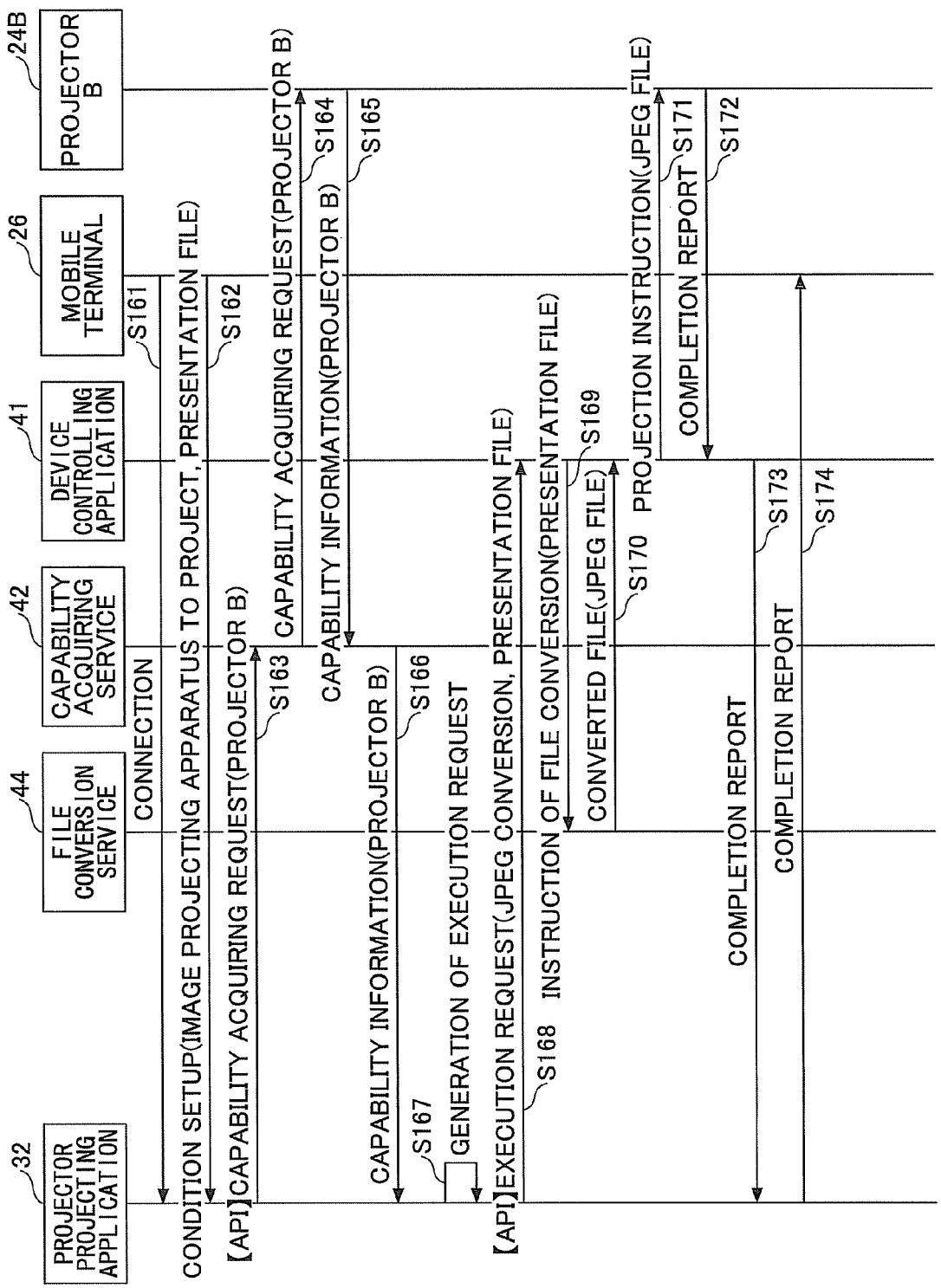
FIG. 11 is an exemplary sequence chart of a projector projecting process using a projector which cannot project a projection file received from a mobile terminal.

FIG. 11 is an exemplary sequence chart of the projector projecting process using the projector which cannot project the projection file received from the mobile terminal. Because FIG. 11 is similar to the sequence chart illustrated in FIG. 10 except for a part of FIG. 11, the explanation is appropriately omitted.

If the user selects the projector projecting process, the image projecting apparatus, by which the projection file is projected, and the projection file to be projected on the mobile terminal 26, the mobile terminal 26 is connected with the projector projecting application 32 in step S161. In step S162, the mobile terminal 26 instructs the projector projecting application 32 to set conditions such as the projector 24B and a presentation file as the projection file to the projector projecting application 32. In steps S163 to S166, the projector projecting application 32 receives the capability of the projector 24A.

In step S167, the projector projecting application 32 determines that the projector 24B cannot project the presentation file based on the received capability of the projector 24B and can project a projection file of an image format JPEG (hereinafter, a JPEG file) based on the received capability of the projector 24B. The projector projecting application 32 generates an execution request for causing the file conversion service 44 to convert the presentation file to the JPEG file and causing the projector 24B to project the JPEG file.

In step S168, the projector projecting application 32 sends the execution request generated in step S167 to the device controlling service 41 via the execution controlling API. In step S169, the device controlling service 41 instructs the file conversion service 44 to convert the presentation file to a JPEG file. The file conversion service 44 executes the conversion from the presentation file to the JPEG file based on the execution instruction from the device controlling service 41. In step S170, the file conversion service 44 sends the converted JPEG file to the device controlling service 41.

In step S171, the device controlling service 41 instructs the projector 24B to execute the projection process of the JPEG file to the projector 24B based on the execution request received via the execution controlling API. The projector 24B executes the projection process of projecting the JPEG file. In steps S172 to S174, a completion report is sent from the projector 24B to the mobile terminal 26 via the device controlling application 41 and the projector projecting application 32.

Referring to the sequence chart of FIG. 11, the information processing apparatus 10 can determine that the projector 24B cannot project the presentation file based on the capability of the projector 24B. Therefore, the information processing apparatus 10 causes the file conversion service 44 of the platform 40 to execute the conversion process of converting the presentation file to the JPEG file and causes the projector 24B to execute the projection process of projecting the JPEG file.

Figure 12:
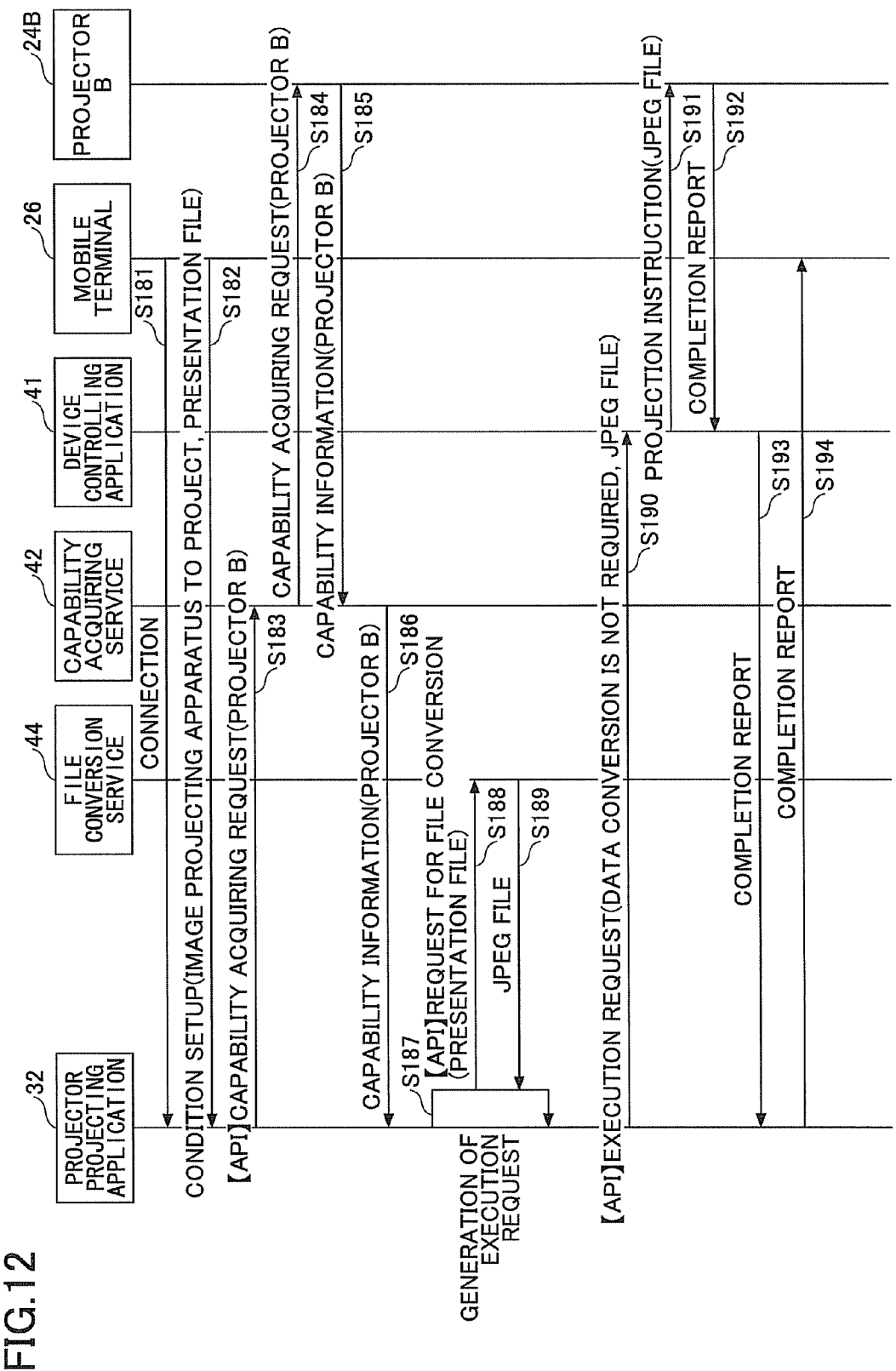
FIG. 12 is an exemplary sequence chart of a projector projecting process in which a file conversion service is used from a projector projecting application.

FIG. 12 is an exemplary sequence chart of the projector projecting process in which the file conversion service is used from the projector projecting application. Because FIG. 12 is similar to the sequence chart illustrated in FIG. 11 except for a part of FIG. 12, the explanation is appropriately omitted.

Because the processes of steps S181 to S186 are similar to the processes of steps S161 to S166, explanation is omitted. In step S187, the projector projecting application 32 determines that the projector 24B cannot project the presentation file but can project the JPEG file based on the received capability of the projector 24B.

In step S188, the projector projecting application 32 sends a request for the conversion process of converting the presentation file to the JPEG file to the file conversion service 44 via the processing service execution API so that the file conversion service executes the conversion process of converting from the presentation file to the JPEG file. In step S189, the file conversion service 44 sends the converted JPEG file to the projector projecting application 32.

The projector projecting application 32 generates an execution request for causing the projector 24B to project the JPEG file. In step S190, the projector projecting application 32 sends the generated execution request to the device controlling service 41 via the execution controlling API. Because the processes of steps S191 or later are similar to the processes of steps S171 or later illustrated in FIG. 11, explanation is omitted.

Referring to the sequence chart of FIG. 12, the information processing apparatus 10 uses the file conversion service 44 of the platform 40 from the projector projecting application 32 without intervening the device controlling service 41. Thus, the conversion process of converting from the presentation file to the JPEG file can be executed.

As described, the information processing apparatus 10 can use the projector projecting process without considering the image format of the projection file to be projected by the projector 24A or 24B. Further, according to the information processing apparatus 10 of the embodiment, the application 30 installed on the information processing apparatus 10 can provide a service while the application 30 collaborates with the platform 40 of the information processing apparatus 10 and the one or more electronic devices connected to the information processing apparatus 10 via the capability acquiring API and the execution controlling API.

<<Specific example of API 55>>

FIG. 13 is an explanatory diagram of an exemplary capability acquiring API. As illustrated in FIG. 13, the capability acquiring API is previously defined so that the application 30 acquires a capability of a desirable electronic device. The capability acquiring API illustrated in FIG. 13 includes "deviceID" indicative of an identifier of the acquired electronic device and "capability" indicative of the capability.

FIG. 14A to 14C are explanatory diagrams of the execution controlling API. FIGS. 14A to 14C illustrate three kinds of execution controlling APIs. FIG. 14A illustrates the API previously determined so that the application executes an execution request for a scan transmission process using the capability of the electronic device, by which scanning is performed. The execution controlling API illustrated in FIG. 14A includes, as arguments, "deviceID" indicative of the identifier of the electronic device, by which scanning is performed, "Address" indicative of a transmission destination of the scanned image data, and "OcrOption" indicative of a location of executing OCR.

FIG. 14B illustrates the API previously determined so that the application 30 executes an execution request for a PULL printing process using the capability of the electronic device, by which printing is performed. The execution controlling API illustrated in FIG. 14B includes, as arguments, "deviceID" indicative of the identifier of the electronic device, by which printing is performed, "ConvertFormat" indicative of a image conversion format, and "FileName" indicative of the file name of a file to be printed.

FIG. 14C illustrates the API previously determined so that the application 30 executes an execution request for a projector projecting process using the capability of the electronic device, by which projecting is performed. The execution controlling API illustrated in FIG. 14C includes, as arguments, "deviceID" indicative of the identifier of the electronic device, by which projecting is performed, "ConvertFormat" indicative of a image conversion format, and "FileName" indicative of the file name of a file to be projected.

FIG. 15 is an explanatory diagram of an example of the processing service execution API. As illustrated in FIG. 15, the processing service execution API is the API previously determined so that the application 30 executes an execution request for a file conversion service 44 provided by the platform 40 without intervening the device controlling service 41. The processing service API illustrated in FIG. 15 includes, as arguments, "ConvertFormat" indicative of an image conversion format, a file name before the conversion, and a file name after the conversion.

<<Device Capability>>

FIG. 16 is an explanatory diagram illustrating an exemplary template of a capability stored in a device capability storing unit. Referring to FIG. 16, the capability stored in the device capability storing unit 50 includes information related to capabilities of an input, an output, or a process for each of the electronic devices, which are connected to the information processing apparatus 10. The capability stored in the device capability storing unit 50 may be information related to at least one of the capabilities of the input, the output, or the process of the electronic device.

<General Overview>

According to the information processing apparatus 10 of the first embodiment, a collaboration process is realized where the application installed in the information processing apparatus 10 collaborates with various electronic devices via the network. Thus, the utility value as the entire information processing system 1 can further be improved. Further, according to the information processing apparatus 10 of the first embodiment, the application 30 installed in the information processing apparatus 10 can be efficiently developed.

Thus, the productivity and the utility value as the entire information processing system 1 can be enhanced.

Further, according to the information processing apparatus 10 of the first embodiment, it becomes possible to provide the capability acquired from a new electronic device connected to the information processing apparatus 10 to the application 30. Thus, a collaboration process where the application 30 collaborates with the new electronic device can be realized.

[Second Embodiment]

The capability may be previously registered into the device capability storing unit 50 out of synchronism with the capability acquiring request. The information processing apparatus 10A of the second embodiment causes the capability to be previously stored in the memory unit 50. Because the second embodiment is similar to the first embodiment except for a part of the second embodiment, explanation is appropriately omitted. Because the system structure and the hardware structure are similar to those of the first embodiment, explanation is omitted.

<Software Structure>

The information processing apparatus 10A of the second embodiment is realized by a processing block chart illustrated in, for example, FIG. 17. FIG. 17 is an exemplary processing block chart of the information processing apparatus of the second embodiment. In comparison with the information processing apparatus 100 illustrated in FIG. 3, the information processing apparatus 100 illustrated in FIG. 17 additionally includes a capability registering unit 51.

The capability registering unit 51 illustrated in FIG. 17 is added to the platform 40. The capability registering unit 51 causes the electronic device to acquire the capability at a time of power on or after installing a device driver or the like. Then, the capability may be stored in the device capability storing unit 50. The capability registering unit 51 may receive registration of the capability from a user through a capability information registration screen described later.

<Detailed Process>

FIG. 18 is an exemplary sequence chart of a process in which a capability is previously registered. Here, an example that the projector 24A previously registers the capability is given. The projector 24A may be an electronic device such as the image forming apparatus 24 or the like. In step S201, the projector 24A requests registration of the capability to the capability registering unit 51 of the information processing apparatus 10A at a time of powering on or after a device driver or the like is installed.

In step S202, the capability registering unit 51 instructs the memory controlling unit 49 to register the capability acquired from the projector 24A into the device capability storing unit 50. The memory controlling unit 49 causes the device capability storing unit 50 to store the capability of the projector 24A into the device capability storing unit 50. In step S203, the completion report is sent from the capability registering unit 51 to the projector 24A.

Because the processes of steps S204 to S206 are similar to the processes of steps S141 to S143 of FIG. 10, explanation is omitted. Hereinafter, explanation is given on the premise that the capability acquiring service 42 determines that the capability of the projector 24A is acquired from the device capability storing unit 50 via the memory controlling unit 49.

In step S207, the capability acquiring service 42 sends a capability acquiring request for the projector 24A to the memory controlling unit 49. The memory controlling unit 49 acquires the capability of the projector 24A from the device capability storing unit 50.

In step S208, the capability acquiring service 42 receives the capability of the projector 24A from the memory controlling unit 49. In step S209, the capability acquiring service 42 sends the capability of the projector 24A to the projector projecting application 32 at the capability acquiring request source. Because the processes of steps S210 or later are similar to the processes of steps S147 or later illustrated in FIG. 10, explanation is omitted.

Referring to the sequence chart of FIG. 18, it is possible for the information processing apparatus 10 to previously register the capability of the projector 24A.

The user can confirm the electronic device whose device capability storing unit 50 stores the capability by a capability information administrating screen 200 illustrated in, for example, FIG. 19. FIG. 19 is an exemplary image chart of the capability information administrating screen. If the user pushes down (selects) a reference and edit button 201 on the capability information administrating screen 200, the displayed screen transits to a capability information screen 210 as illustrated in FIG. 20. If the user pushes down (selects) a new registration button 202 on the capability information administrating screen 200, the displayed screen may transit to a capability information screen 210 as illustrated in FIG. 20.

FIG. 20 is an exemplary image chart of the capability information screen. The capability information screen 210 receives registration and editing of basic information and capability information. The capability information screen 210 is provided to edit the capability information. The capability information screen 210 includes a column 211 for editing information related to input capability, a column 212 for editing information related to process capability, and a column 213 for editing information related to output capability.

When the user pushes down a completion button 214 on the capability information screen 210, the registration and the editing of the basic information and the capability information are completed, and the displayed screen is caused to transit to the capability information administrating screen 200 illustrated in FIG. 19. Further, the user can delete the capability of the electronic device displayed on the capability information screen 210 by pushing down a delete apparatus button 215 on the capability information screen 210.

Items of the capability information on the capability information screen 210 illustrated in FIG. 20 can be selected based on a template of the capability illustrated in, for example, FIG. 16. The screen images illustrated in FIGS. 19 and 20 can be generated when a UI generating unit (not illustrated) accesses the device capability storing unit 50 via, for example, the memory controlling unit 49.

A collaboration processing apparatus recited in claims corresponds to an information processing apparatus 10. A collaboration processing system 1 recited in claims corresponds to the information processing system 1. An interface recited in claims corresponds to the API 55. A capability information providing unit recited in claims corresponds to the capability acquiring service 42. An execution controlling unit recited in claims corresponds to the device controlling service 41. Information related to the capability of the electronic device recited in claims corresponds to the capability.

A memory controlling unit recited in claims corresponds to the memory controlling unit 49. A processing unit recited in claims corresponds to the processing service such as the OCR service 43. An application administrating unit recited in claims corresponds to the application administrating unit 47. An service administrating unit recited in claims corresponds to the service administrating unit 48. The capability information registering unit recited in the claims corresponds to the capability registering unit 51.

According to the embodiments, there are provided the collaboration processing apparatus, the collaboration processing system, and the program, by which the electronic device to be connected collaborates with the application installed in it.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.

The hardware platform includes any desired hardware resources including, for example, a central processing unit (CPU), a random access memory (RAM), and a hard disk drive (HDD). The CPU may include processors of any desired kinds and numbers. The RAM may include any desired volatile or nonvolatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the collaboration processing apparatus has been described in detail, it should be understood that various changes, substitutions, and alterations could be made thereto without departing from the spirit and scope of the invention.

This patent application is based on Japanese Priority Patent Application No. 2012-065107 filed on Mar. 22, 2012 and Japanese Priority Patent Application No. 2012-258189 filed on Nov. 27, 2012, the entire contents of which are hereby incorporated herein by reference

What is claimed is:

1. A collaboration processing apparatus comprising a hardware processor that executes a program so as to implement:

an application that receives set conditions of electronic devices that are connected through a connector to the collaboration processing apparatus, the electronic devices including a scanner, a capability information providing unit which receives an acquisition request for acquiring capability information that indicates the set conditions of the electronic devices including the scanner for specifying whether the each of the electronic devices is capable of performing at least a predetermined process of the each of the electronic devices using the set conditions from the application via a previously defined API, sends the acquisition request to the scanner in response to the acquisition request received via the previously defined API, and receives the capability information of the scanner from the scanner, and sends the received capability information to the application, the application determining whether the scanner includes a function of performing an optical character recognition (OCR) process based on the received capability information, the application generating an execution request to scan an image data by the scanner and undergo the OCR process for the scanned image data upon determination that the scanner includes the function of performing the OCR process;

an execution controlling unit which receives the execution request generated by the application based on the capability information from the application via the previously defined API, and controls the scanner based on the received execution request to perform the predetermined process, wherein, upon determination that the scanner does not include the function of performing the OCR process, the application generates the execution request to scan the image data by the scanner, and the execution controlling unit causes the scanned image data to be provided to the collaboration processing apparatus, the collaboration processing apparatus performing the OCR process on the provided scanned image data;

a memory controlling unit enabling a memory device included in the collaboration processing apparatus to store the capability information of each of the electronic devices connected to the collaboration processing apparatus; and a capability information registering unit which receives a registration request to register the capability information of each of the electronic devices to be connected to the collaboration processing apparatus, provides a capability information screen with each of the electronic devices, and registers the capability information, which is input through the capability information screen, in the memory device, wherein the capability information providing unit provides the application requesting the capability information of each of the electronic devices with the capability information of each of the electronic devices when the capability information of each of the electronic devices is not acquired in response to the acquisition request.

2. The collaboration processing apparatus according to claim 1, wherein the capability information providing unit acquires the capability information of the electronic devices in response to the acquisition request and provides the application requesting the acquired capability information of the electronic devices with the acquired capability information of the electronic devices.

3. The collaboration processing apparatus according to claim 2, further comprising:

a memory controlling unit causing a memory device to store the capability information of the scanner acquired by the capability information providing unit;

the capability information providing unit determines whether the capability information of the scanner in response to the acquisition request is acquired from the scanner or the memory device, and when it is determined that the capability information of the electronic device is received from the scanner, the capability information providing unit acquires the capability information of the scanner from the scanner and provides the capability information of the scanner with the application requesting the information.

4. The collaboration processing apparatus according to claim 1, wherein the capability information providing unit receives the acquisition request via a first API included in the previously defined API, and the execution controlling unit receives the execution request via a second API included in the previously defined API.

5. The collaboration processing apparatus according to claim 1, further comprising:

one or more processing units which perform the predetermined process, wherein the execution controlling unit determines whether the predetermined process related to the execution request is performed by the collaboration processing apparatus, and when the predetermined process is determined to be performed by the collaboration processing apparatus, the predetermined process related to the execution request is caused to be executed by using the one or more processing units included in the collaboration processing apparatus.

6. The collaboration processing apparatus according to claim 1, further comprising:

one or more processing units which receive a processing request causing the predetermined process to be executed via the previously defined API and executes the predetermined process based on the received processing request.

7. The collaboration processing apparatus according to claim 6, wherein at least one of the processing units provides the application requesting the capability information with a result of execution based on the execution request of the predetermined process based on the executed processing request.

8. The collaboration processing apparatus according to claim 6, wherein the processing unit receives the processing request via a third interface included in the previously defined API.

9. The collaboration processing apparatus according to claim 1, wherein a plurality of applications are installed into the collaboration processing apparatus, and the capability information providing unit can receive an acquisition request for the capability information of the scanner, which is connected to the collaboration processing apparatus, via the previously defined API from each of the plurality of applications installed on the collaboration processing apparatus.

10. The collaboration processing apparatus according to claim 1, further comprising:
an application administrating unit which causes the plurality of applications to be added, deleted, or changed.

11. The collaboration processing apparatus according to claim 5, further comprising:
a service administrating unit causing the one or more processing units to be added, deleted, or changed for each of the processing units.

12. The collaboration processing apparatus according to claim 1,
wherein the capability information of the scanner relates to at least one of capabilities including at least one capability among an input, an output, and the predetermined process.

13. The collaboration processing apparatus according to claim 1,
wherein the application to be installed is developed using a software development kit (SDK) by which the application is developed using the previously defined API.

14. The collaboration processing apparatus according to claim 1,
wherein the collaboration processing apparatus is formed by a plurality of apparatuses.

15. The collaboration processing apparatus according to claim 1,
wherein the capability information registering unit receives the registration request for the capability information of the scanner from the electronic devices connected to the collaboration processing apparatus.

16. A collaboration processing method executed in a collaboration processing apparatus by a hardware processor, the collaboration processing method comprising:
receiving set conditions of electronic devices that are connected through a connector to the collaboration processing apparatus from an application installed in the collaboration processing apparatus, the electronic devices including a scanner,
receiving, via a capability information providing unit, an acquisition request for acquiring capability information that indicates the set conditions of the electronic devices including the scanner for specifying whether the each of the electronic devices is capable of performing at least a predetermined process of the each of the electronic devices using the set conditions from the application via a previously defined API to cause the capability information providing unit to initiate processes of
sending the acquisition request to the scanner in response to the acquisition request received via the previously defined API,
receiving the capability information of the scanner from the scanner, and
sending the received capability information to the application, the application determining whether the scanner includes a function of performing an optical character recognition (OCR) process based on the received capability information, the application generating an execution request to scan an image data by the scanner and undergo the OCR process for the scanned image data upon determination that the scanner includes the function of performing the OCR process;
receiving, by the execution controlling unit, an execution request generated by the application based on the capability information from the application via the previously defined API;
controlling, by the execution controlling unit, the scanner to perform the predetermined process based on the received execution request, wherein, upon determination that the scanner does not include the function of performing the OCR process, the application generates the execution request to scan the image data by the scanner, and the execution controlling unit causes the scanned image data to be provided to the collaboration processing apparatus, the collaboration processing apparatus performing the OCR process on the provided scanned image data;
enabling, by a memory controlling unit, a memory device included in the collaboration processing apparatus to store the capability information of each of the electronic devices connected to the collaboration processing apparatus; and
receiving, by a capability information registering unit, a registration request to register the capability information of each of the electronic devices to be connected to the collaboration processing apparatus;
providing, by the capability information registering unit, a capability information screen with each of the electronic devices; and
registering, by the capability information registering unit, the capability information, which is input through the capability information screen, in the memory device,
wherein, in the receiving the acquisition request, the capability information providing unit provides the application requesting the capability information of each of the electronic devices with the capability information of each of the electronic devices when the capability information of each of the electronic devices is not acquired in response to the acquisition request.

17. A network system comprising:
one or more information processing apparatuses,
wherein the one or more information processing apparatuses include:
one or more processors; and
a memory storing one or more programs and one or more application programs which are executed by the one or more processors, the one or more programs including instructions for:
receiving set conditions of electronic devices that are connected through a connector to the network system, the electronic devices including a scanner,
receiving, from an application program among the one or more application programs via a previously defined API, an acquisition request for acquiring capability information that specifies whether each of the electronic devices that are connected through a connector to the network system is capable of performing at least a predetermined process of each of the electronic devices using the set conditions from the application via a previously defined API;
sending the acquisition request to the scanner in response to the acquisition request received via the previously defined API,
receiving the capability information of the scanner from the scanner;

sending the received capability information of the scanner to the application program which sent the acquisition request, the application determining whether the scanner includes a function of performing an optical character recognition (OCR) process based on the received capability information, the application generating an execution request to scan an image data by the scanner and undergo the OCR process for the scanned image data upon determination that the scanner includes the function of performing the OCR process;

receiving, from the application program that is provided with the capability information via the previously defined API, the execution request for processing using the scanner, the execution request is generated by the application program based on the provided capability information;

controlling the scanner to perform the predetermined process based on the received execution request, wherein, upon determination that the scanner does not include the function of performing the OCR process, the application generates the execution request to scan the image data by the scanner, and the execution controlling unit causes the scanned image data to be provided to one of the one or more information processing apparatuses, the one of the one or more information processing apparatuses performing the OCR process on the provided scanned image data;

enabling, by a memory controlling unit, a memory device included in the collaboration processing apparatus to store the capability information of each of the electronic devices connected to the collaboration processing apparatus; and receiving, by a capability information registering unit, a registration request to register the capability information of each of the electronic devices to be connected to the collaboration processing apparatus;

providing, by the capability information registering unit, a capability information screen with each of the electronic devices; and registering, by the capability information registering unit, the capability information, which is input through the capability information screen, in the memory device, wherein, in the receiving the acquisition request, the capability information providing unit provides the application requesting the capability information of each of the electronic devices with the capability information of each of the electronic devices when the capability information of each of the electronic devices is not acquired in response to the acquisition request.

* * * * *